United States Patent
Kwak et al.

(10) Patent No.: US 11,148,290 B2
(45) Date of Patent: *Oct. 19, 2021

(54) PLURALITY OF ROBOT CLEANER AND A CONTROLLING METHOD FOR THE SAME

(71) Applicant: LG Electronics Inc., Seoul (KR)

(72) Inventors: Donghoon Kwak, Seoul (KR); Jaehwan Ko, Seoul (KR); Hyukdo Kweon, Seoul (KR)

(73) Assignee: LG Electronics Inc., Seoul (KR)

( * ) Notice: Subject to any disclaimer, the term of this patent is extended or adjusted under 35 U.S.C. 154(b) by 268 days.

This patent is subject to a terminal disclaimer.

(21) Appl. No.: 16/401,666

(22) Filed: May 2, 2019

(65) Prior Publication Data
US 2019/0337155 A1    Nov. 7, 2019

(30) Foreign Application Priority Data

May 4, 2018 (KR) .................. 10-2018-0051963
Feb. 1, 2019 (KR) .................. 10-2019-0014052

(51) Int. Cl.
*A47L 5/22*    (2006.01)
*B25J 9/16*    (2006.01)
(Continued)

(52) U.S. Cl.
CPC .............. *B25J 9/1666* (2013.01); *A47L 5/22* (2013.01); *A47L 11/4011* (2013.01);
(Continued)

(58) Field of Classification Search
CPC .. A47L 2201/04; A47L 9/2852; A47L 9/2805; A47L 11/4066; A47L 11/4011;
(Continued)

(56) References Cited

U.S. PATENT DOCUMENTS

2017/0351265 A1    12/2017 Eagling et al.
2019/0176330 A1*   6/2019 Noh .................. G05D 1/0255
(Continued)

FOREIGN PATENT DOCUMENTS

CN    1834839 A    9/2006
CN    101554302 A   10/2009
(Continued)

OTHER PUBLICATIONS

You et al., The Design of On-line Mobile Robot over Bluetooth Technology, 2006, IEEE, pg. (Year: 2006).*

(Continued)

*Primary Examiner* — McDieunel Marc
(74) *Attorney, Agent, or Firm* — Finnegan, Henderson, Farabow, Garrett & Dunner LLP

(57) ABSTRACT

A mobile robot may include a traveling unit configured to move a main body; a communication unit configured to communicate with another mobile robot that emits a signal; and a controller configured to recognize the location of the another mobile robot based on the signal, and control the moving of the another mobile robot to follow along a moving path of the main body based on the recognized location. In addition, the controller may transmit a signal corresponding to a change of the moving direction to the main body in response to the change of the moving direction, and sense a change in the receiving direction of the signal according to the change of moving direction to transmit a control command for restricting the follow-up to the another mobile robot.

18 Claims, 27 Drawing Sheets

(51) Int. Cl.
  *B25J 11/00* (2006.01)
  *B25J 9/00* (2006.01)
  *A47L 11/40* (2006.01)
(52) U.S. Cl.
  CPC ......... *B25J 9/0084* (2013.01); *B25J 11/0085* (2013.01); *A47L 2201/04* (2013.01)
(58) Field of Classification Search
  CPC ...... A47L 9/28; A47L 9/2894; A47L 11/4061; A47L 9/2857; A47L 11/4069; A47L 2201/02; A47L 2201/022; A47L 2201/028; A47L 5/22; A47L 9/009; A47L 9/2873; A47L 7/0085; A47L 9/00; A47L 11/24; A47L 11/4013; A47L 2201/06; G05D 2201/0203; G05D 1/0295; G05D 2201/0215; G05D 1/028; G05D 1/0246; G05D 1/0255; G05D 1/0225; G05D 1/0282; G05D 1/0287; G05D 1/0289; G05D 1/0088; G05D 1/0219; G05D 1/0242; G05D 2201/0208; G05D 1/0022; G05D 1/0212; G05D 1/0272; G05D 1/0274; G05D 1/0293; G05D 1/02; G05D 1/0027; G05D 1/0044; G05D 1/0221; G05D 1/0234; G05D 1/024; G05D 1/0278; G05D 1/0011; G05D 1/0223; G05D 1/0238; G05D 1/0248; G05D 1/0251; G05D 1/0276; G05D 1/0291; G05D 1/0236; G05D 1/0016; G05D 1/0033; G05D 1/0257; B25J 11/0085; B25J 9/1666; B25J 9/1664; B25J 9/1682; B25J 11/00; B25J 5/007; B25J 19/02; B25J 9/1676; B25J 9/1674; B25J 9/1697; B25J 19/023; B25J 9/00; B25J 9/0084; B25J 9/16; B25J 19/005; B25J 19/022; B25J 11/008; B25J 9/1692; B25J 9/1694; B25J 13/08; B25J 9/1602; B25J 9/1679; A01D 34/008; A01D 2101/00; A01D 34/08; G01S 5/0284; G01S 15/931; G01S 5/16; G01S 13/74; G01S 5/14; G01S 13/0209; G01S 1/024; G01S 1/68; G01S 2205/02; G01S 13/876; G06N 20/00; G06K 9/00664; G06K 9/3233; G06K 9/4628; G06K 9/4671; G06K 9/627
  See application file for complete search history.

(56) References Cited

U.S. PATENT DOCUMENTS

| | | | | |
|---|---|---|---|---|
| 2019/0339711 A1* | 11/2019 | Kwak | ............... | G05D 1/0293 |
| 2019/0339714 A1* | 11/2019 | Kwak | ............... | G05D 1/0255 |
| 2020/0037498 A1* | 2/2020 | Ko | ............... | A01D 34/008 |
| 2020/0077861 A1* | 3/2020 | Kwak | ............... | G05D 1/0289 |
| 2020/0081453 A1* | 3/2020 | Kwak | ............... | G05D 1/0287 |
| 2020/0081454 A1* | 3/2020 | Kwak | ............... | A47L 11/4061 |
| 2020/0081456 A1* | 3/2020 | Kwak | ............... | G05D 1/0238 |
| 2021/0026364 A1* | 1/2021 | Shin | ............... | A47L 9/2852 |

FOREIGN PATENT DOCUMENTS

| | | |
|---|---|---|
| CN | 101971116 A | 2/2011 |
| CN | 102915465 A | 2/2013 |
| CN | 103076803 A | 5/2013 |
| CN | 103777638 A | 5/2014 |
| CN | 104615132 A | 5/2015 |
| CN | 106132187 A | 11/2016 |
| CN | 106708057 A | 5/2017 |
| CN | 106853641 A | 6/2017 |
| CN | 106997205 A | 8/2017 |
| CN | 107087435 A | 8/2017 |
| JP | H 06274223 A | 9/1994 |
| JP | 2006134221 A | 5/2006 |
| JP | 2006146491 A | 6/2006 |
| JP | 2008191800 A | 8/2008 |
| JP | 2009080804 A | 4/2009 |
| JP | 4351261 B2 | 10/2009 |
| JP | 2010108433 A | 5/2010 |
| KR | 10-2012-0090387 A | 8/2012 |
| KR | 10-1641022 B1 | 7/2016 |
| KR | 10-1758736 B1 | 7/2017 |
| TW | 1601614 B | 10/2017 |
| WO | WO 2017036532 A1 | 3/2017 |
| WO | WO 2017/212987 A1 | 12/2017 |

OTHER PUBLICATIONS

Uddin et al., Path mapping and control of mobile cleaning robot using LED-ID network, 2011, IEEE, p. 123-126 (Year: 2011).*
Sibai et al., Evaluation of indoor mobile robot localization techniques, 2012, IEEE, p. 1-6 (Year: 2012).*
Ismail et al., Investigation of homogeneous multi robots communication via Bluetooth, 2012, IEEE, p. 124-129 (Year: 2012).*
Office Action received in Taiwanese Patent Application No. 108115285, dated Sep. 29, 2020 (22 pages).
International Search Report received from the Korean Intellectual Property Office (KIPO) in PCT/KR2019/005228, dated Aug. 20, 2019.
Notice of Allowance received in Korean Patent Application No. KR 10-2019-0014052, dated Oct. 21, 2019.
Office Action received in Chinese Patent Application No. 201980045132. 7, dated Jul. 13, 2021 (20 pages).

* cited by examiner

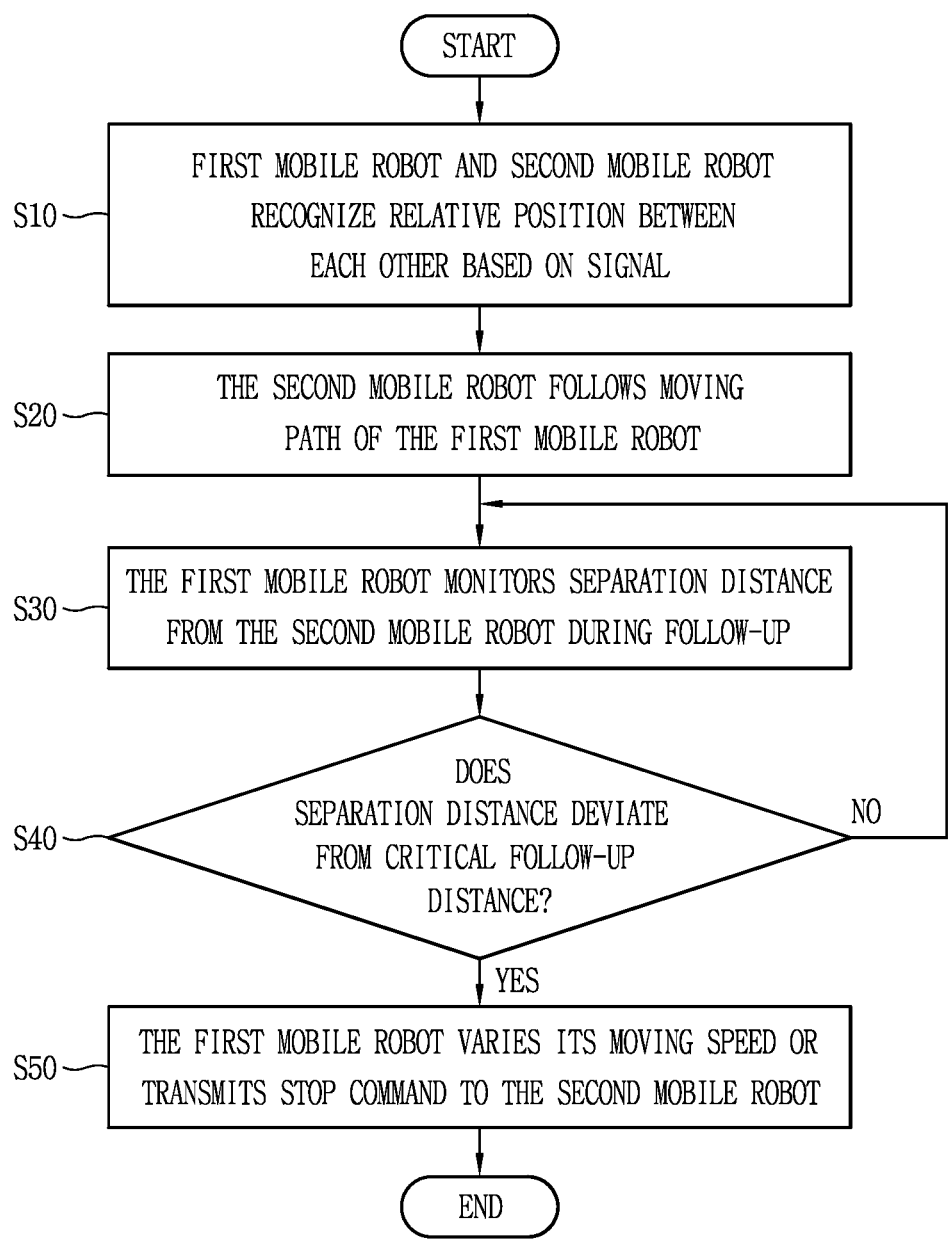

FIG. 8C
(a)
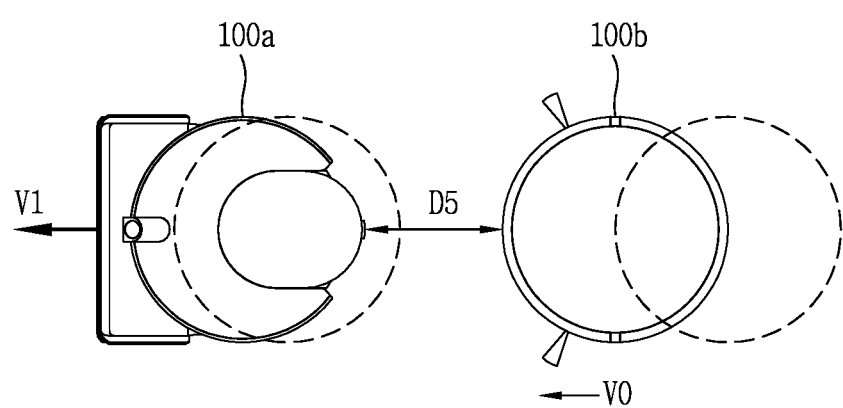
(b)
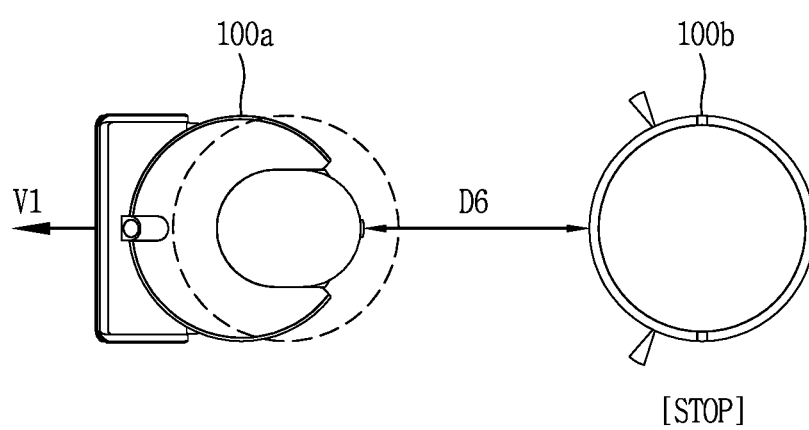

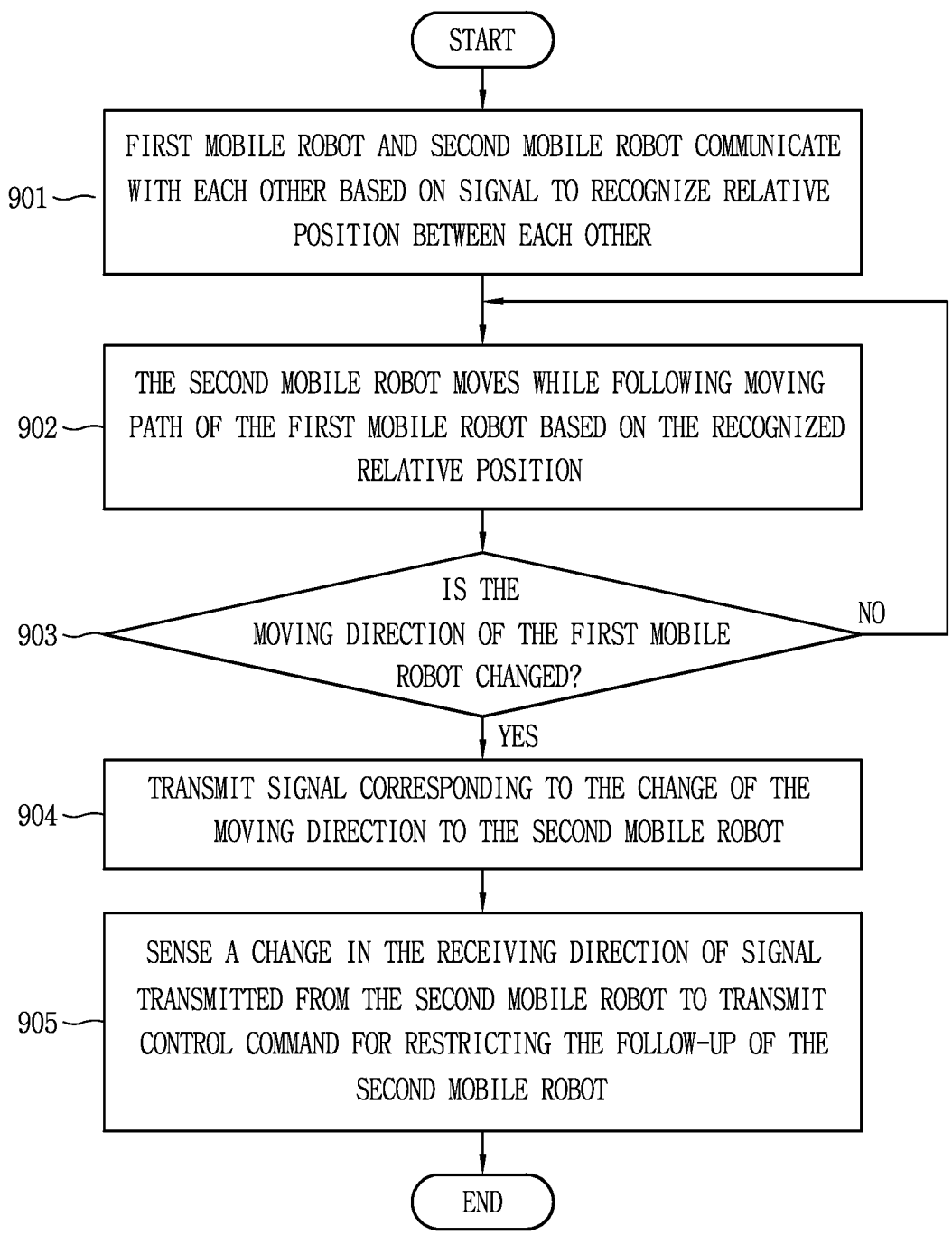

FIG. 12E
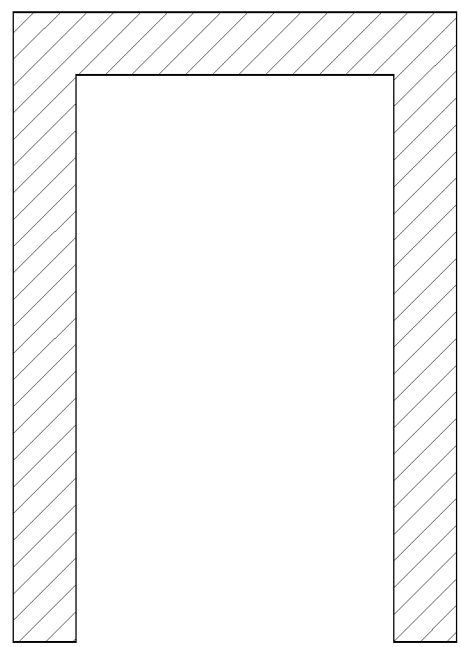
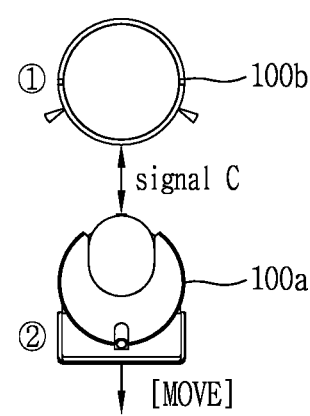

PLURALITY OF ROBOT CLEANER AND A CONTROLLING METHOD FOR THE SAME

CROSS-REFERENCE TO RELATED APPLICATIONS

Pursuant to 35 U.S.C. § 119(a), this application claims the benefit of the earlier filing date and the right of priority to Korean Application Nos. 10-2018-0051963 and 10-2019-0014052, filed on May 4, 2018 and Feb. 1, 2019, respectively, the contents of which is incorporated by reference herein in its entirety.

BACKGROUND OF THE INVENTION

1. Field of the Invention

The present disclosure relates to a plurality of mobile robots that autonomously move while any one thereof follows another one thereof, and a control method thereof.

2. Description of the Conventional Art

Generally, a mobile robot is a device that automatically performs a predetermined operation while moving by itself in a predetermined area without a user's operation. The mobile robot senses obstacles located in the area and performs its operations by moving close to or away from such obstacles.

Such mobile robot may include a robot cleaner that performs cleaning while moving in an area. The robot cleaner is a cleaner that performs cleaning while moving by itself without user's operation.

In this manner, with the development of such a robot cleaner performing cleaning while moving by itself without a user's operation, there is a need to develop a plurality of robot cleaners for performing cleaning while any one thereof follows another one thereof or while collaborating with each other without a user's operation.

For example, the prior art document WO2017-036532 discloses a method in which a master robot cleaner (hereinafter, referred to as a master robot) controls at least one slave robot cleaner (hereinafter, referred to as a slave robot).

The prior art document discloses a configuration in which the master robot detects adjacent obstacles by using an obstacle detection device and determines its position related to the slave robot using position data derived from the obstacle detection device.

In addition, the prior art discloses a configuration in which the master robot and the slave robot perform communication with each other via a server using wireless local area network (WLAN) technology.

According to the prior art document, the master robot can determine the position of the slave robot but the slave robot cannot determine the position of the master robot.

Further, in order for the slave robot to determine (decide) the position of the master robot using the configuration disclosed in the prior art document, the master robot must transmit relative position information regarding the slave robot determined by the master robot to the slave robot through the server.

However, the prior art fails to disclose such a configuration in which the master robot transmits relative position information to the slave robot via the server.

In addition, even if it is assumed that the master robot transmits relative position information, the master robot and the slave robot should perform communication only through the server. Accordingly, such communication with the server may be disconnected when the master robot or the slave robot is located at a place where it is difficult to communicate with a server.

In this case, since the slave robot is unable to receive relative position information from the server, the slave robot is unable to know the position of the master robot. As a result, there may arise a problem that follow-up or collaboration among a plurality of robot cleaners is not efficiently performed.

Furthermore, the robot cleaner changes its moving direction several times while moving to clean a designated cleaning space. For example, it is often required to change a current moving direction frequently changes depending on a shape of a cleaning space, a moving mode of the robot cleaner, detection of an obstacle, a topographic characteristic of the floor, and the like.

When any one of the plurality of robot cleaners follows another one to perform collaboration cleaning, a collision problem with the following cleaner moving behind may occur when the leading cleaner changes its moving direction. In addition, there may arise a problem that the front and rear positions of the leading cleaner and the following cleaner are reversed after a predetermined period of time depending on a degree of rotation when changing the moving direction. Even in such a case, there may arise a problem that follow-up or collaboration among a plurality of robot cleaners is not efficiently performed. This is also the same for a plurality of mobile robots capable of collaboration.

SUMMARY OF THE INVENTION

Accordingly, an object of the present disclosure is to provide a plurality of mobile robots capable of moving while any one thereof follows a moving path of another one thereof with no interference or collision with each other without going through a server, and a control method thereof.

Furthermore, another object of the present disclosure is to provide a plurality of mobile robots that can be controlled to perform flexible follow-up without any interruption when any one of the plurality of mobile robots follows another one thereof, and a control method thereof.

In addition, still another object of the present disclosure is to provide a plurality of mobile robots capable of allowing a collision-free avoidance design in which there is no collision with a following mobile robot even when a leading mobile robot changes its current moving direction during follow-up of a plurality of mobile robots, and a control method thereof.

Moreover, yet still another object of the present disclosure is to provide a plurality of mobile robots capable of continuously performing follow-up without any interference even when the leading mobile robot changes its moving direction and is located visually behind the following mobile robot, and a control method thereof.

In the present disclosure, in order to perform flexible follow-up without any interruption among the plurality of mobile robots, it is implemented to recognize a relative position of the following mobile robot on the basis of a signals, and follow along a moving path of the leading mobile robot based on the recognized relative position.

Furthermore, when the moving direction of the leading mobile robot is changed, a signal informing it to the following mobile robot may be transmitted, and the leading mobile robot or the following mobile robot may sense a change in the receiving direction of the signal to sense that the moving direction has been changed in a direction gradually getting close to the following mobile robot, thereby implementing a collision-free avoidance design and allowing the leading mobile robot to continuously move without interfering with the following mobile robot.

Here, a change in the receiving direction of the signal may sense that the receiving direction of the mobile terminal 100 is changed from forward to rearward or from rearward to forward through a plurality of receiving antennas disposed on rear and front sides of the mobile robot, respectively, or disposed to be spaced from each other on a front side of the mobile robot, or to be spaced from each other on a rear side of the mobile robot.

In addition, when a change in the receiving direction of the signal is sensed between a plurality of mobile robots, the leading mobile robot may output a follow-up restriction command. The follow-up restriction command may include a moving stop command of the following mobile robot.

In addition, follow-up restriction may be released at a time point when a change in the receiving direction of signals between a plurality of mobile robots is sensed again. When the follow-up restriction release command is output, the following mobile robot performs follow-up moving again. At this time, the leading mobile robot may decelerate the moving or stop the moving temporarily so that a follow-up distance with the following mobile robot does not exceed a specified range.

As the following mobile robot changes its moving direction similarly to the preceding leading mobile robot, a change in the receiving direction of the signal is additionally sensed again, and when the moving direction of the leading mobile robot coincides with that of the tracking mobile robot, the leading mobile robot may initiate moving at an original moving speed.

Specifically, a mobile robot according to an embodiment of the present disclosure may include a traveling unit configured to move a main body; a communication unit configured to communicate with another mobile robot that emits a signal; and a controller configured to recognize the location of the another mobile robot based on the signal, and control the moving of the another mobile robot to follow along a moving path of the main body based on the recognized location, wherein the controller transmits a signal corresponding to a change of the moving direction to the main body in response to the change of the moving direction, and senses a change in the receiving direction of the signal according to the change of moving direction to transmit a control command for restricting the follow-up to the another mobile robot.

Furthermore, in one embodiment, the control command for restricting the follow-up may include a moving stop command of the another mobile robot and a follow-up release command for the main body, and the restriction of the follow-up may be continued until a specified condition is satisfied subsequent to sensing the change in the receiving direction of the signal.

Furthermore, in one embodiment, the restriction of the follow-up may be released when at least one of a lapse of a predetermined period of time subsequent to sensing a change in the receiving direction of the signal, an increase of a separation distance between the main body and the another mobile robot by more than a predetermined range, and a re-change in the receiving direction of the signal is satisfied.

Furthermore, in one embodiment, the controller may vary the moving speed of the traveling unit or transmit a stop command to the another mobile robot so that the another mobile robot does not deviate from a specified critical follow-up distance while the another mobile robot follows the moving path of the main body.

Furthermore, in one embodiment, the controller may transmit a control command for controlling the another mobile robot to move or rotate while avoiding the main body when it is sensed that the main body approaches the another mobile robot within a reference range according to the change of the moving direction.

Furthermore, in one embodiment, the controller may transmit a control command for restricting the follow-up to the another mobile robot when the signal is received from the front side with respect to the moving direction of the main body, and control the another mobile robot to follow the moving path of the main body again when the signal is received from the rear side with respect to the moving direction of the main body while the main body is moving in the next moving region subsequent to the change of the moving direction.

Furthermore, in one embodiment, the controller may control the traveling unit to allow the main body to move out of a current moving region while avoiding the another mobile robot when it is sensed that the main body approaches the another mobile robot within a reference range according to the change of the moving direction, and determined that the another mobile robot is unable to move or rotate while avoiding the main body.

Furthermore, in one embodiment, the controller may transmit a control command for controlling the another mobile robot to perform reverse moving by deviating from a specified critical follow-up distance when it is sensed that the main body approaches the another mobile robot within a reference range according to the change of the moving direction, and determined that both the main body and the another mobile robot are unable to move out of a current moving region.

In addition, a plurality of mobile robots may be a plurality of mobile robots including a first mobile robot and a second mobile robot, wherein the first mobile robot communicates with the second mobile robot emitting a first signal to recognize the location of the second mobile robot, and controls the moving of the second mobile robot to follow the moving path of the first mobile robot based on the recognized location, and the second mobile robot communicates with the first mobile robot emitting a second signal to recognize the location of the first mobile robot, and receives a corresponding signal in response to a change in the moving direction of the first mobile robot, and the first mobile robot senses a change in the receiving direction of the first signal according to the change of the moving direction to control the second mobile robot so as to restrict follow-up to the first mobile robot.

Furthermore, in one embodiment, the first mobile robot may vary the moving speed of the first mobile robot or transmit a stop command to the second mobile robot so that the second mobile robot does not deviate from a specified critical follow-up distance while the second mobile robot follows the first mobile robot.

Furthermore, in one embodiment, when it is sensed that the first mobile robot approaches the second mobile robot within a reference range according to the change of the moving direction, the first mobile robot may control the second mobile robot to move while avoiding the second mobile robot by moving out of a current moving region.

Furthermore, in one embodiment, the second mobile robot may discontinue follow-up to the first mobile robot when the first signal is received from the front side with respect to the moving direction of the first mobile robot, and the second mobile robot may follow the moving path of the first mobile robot again when the first signal is received from the rear side with respect to the moving direction of the second mobile robot while the first mobile robot moves in the next moving region subsequent to the change of the moving direction.

In addition, a method of controlling a plurality of mobile robots according to an embodiment of the present disclosure may include allowing a first mobile robot emitting a first signal to communicate with a second mobile robot emitting a second signal; mutually recognizing the locations of the first and second mobile robots based on the first and second signals; allowing the second mobile robot to follow along the moving path of the first mobile robot based on the recognized location; and receiving a signal corresponding to a change in the moving direction of the first mobile robot at the second mobile robot in response to the change of the moving direction, and allowing the first mobile robot to sense a change in the receiving direction of the second signal according to the change of the moving direction to restrict the follow-up.

Furthermore, in one embodiment, said restricting the follow-up may include the moving stop of the second mobile robot and follow-up release for the first mobile robot, and the restriction of the follow-up may be terminated when a specified condition is satisfied subsequent to a change in the receiving direction of the second signal.

Furthermore, in one embodiment, said restriction the follow-up may be released when at least one of a lapse of a predetermined period of time subsequent to sensing a change in the receiving direction of the second signal, an increase of a separation distance between the plurality of mobile robots by more than a predetermined range, and a re-change in the receiving direction of the second signal is satisfied.

Furthermore, in one embodiment, said following along the moving path of the first mobile robot may include varying the moving speed of the traveling unit of the first mobile robot or stopping the second mobile robot so that the second mobile robot does not deviate from a specified critical follow-up distance while following the moving path of the first mobile robot.

Furthermore, in one embodiment, the method may further include controlling the second mobile robot to move while avoiding the first mobile robot by moving out of a current moving region when it is sensed that the first mobile robot approaches the second mobile robot within a reference range according to the change of the moving direction.

Furthermore, in one embodiment, said sensing a change in the receiving direction of the second signal to restrict the follow-up may be carried out while the second signal is received from the front with respect to the moving direction of the first mobile robot subsequent to the change of the moving direction, and may further include allowing the second mobile robot to follow the moving path of the first mobile robot again when the second signal is received from the rear side with respect to the moving direction of the first mobile robot.

As described above, according to a plurality of mobile robots according to an embodiment of the present disclosure, the following mobile robot may move without any interruption while following the leading mobile robot without going through a server.

Furthermore, when the following cleaner changes the moving direction in accordance with a moving mode or by sensing a topographic feature of the floor, obstacles or the like, the leading cleaner, the following cleaner, or the leading cleaner and the following cleaner may temporarily change their paths to move while avoiding each other, thereby performing follow-up control in a more natural and efficient manner.

Moreover, when the leading cleaner is visually positioned behind the following cleaner in accordance with a change of the moving direction of the leading cleaner, the direction of a signal received from the following cleaner may be detected to stand by when the following cleaner is in front of the leading cleaner, and resume follow-up after confirming that the following cleaner is behind the leading cleaner, thereby performing follow-up with no signal interference and error occurrence.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention. In the drawings:

FIGS. 6, 7, 8A, 8B and 8C are views for specifically explaining a method of more flexibly performing follow-up while a plurality of mobile robots according to an embodiment of the present disclosure maintain a predetermined distance from one another.

FIG. 9 is an exemplary flowchart for explaining a process of limiting the follow-up of the second cleaner while performing the turning of the first cleaner according to an embodiment of the present disclosure.

FIGS. 12A, 12B, 12C, 12D and 12E are conceptual views for explaining another example in which the second cleaner is allowed to move in a situation that both the first cleaner and the second cleaner are unable to avoid subsequent to the turning of the first cleaner according to an embodiment of the present disclosure.

DETAILED DESCRIPTION OF THE PREFERRED EMBODIMENT

Hereinafter, a mobile robot according to the present disclosure will be described in detail with reference to the accompanying drawings.

Hereinafter, description will be given in detail of embodiments disclosed herein. Technical terms used in this specification are merely used for explaining specific embodiments, and should not be constructed to limit the scope of the technology disclosed herein.

First, the term "mobile robot" disclosed herein may be used as the same meaning as "robot (for a specific function)," "robot cleaner," "robot for cleaning" and "autonomous cleaner," and those terms will be used equally.

Furthermore, the term "a plurality of mobile robots" disclosed in the present disclosure may be used as "a plurality of robot cleaners" or "a plurality of cleaners". Furthermore, the term a "first mobile robot" may be named a "first robot", a "first robot cleaner", or a "first cleaner". Furthermore, the term a "second mobile robot" may be named a "second robot", a "second robot cleaner", or a "second cleaner".

Figure 1:
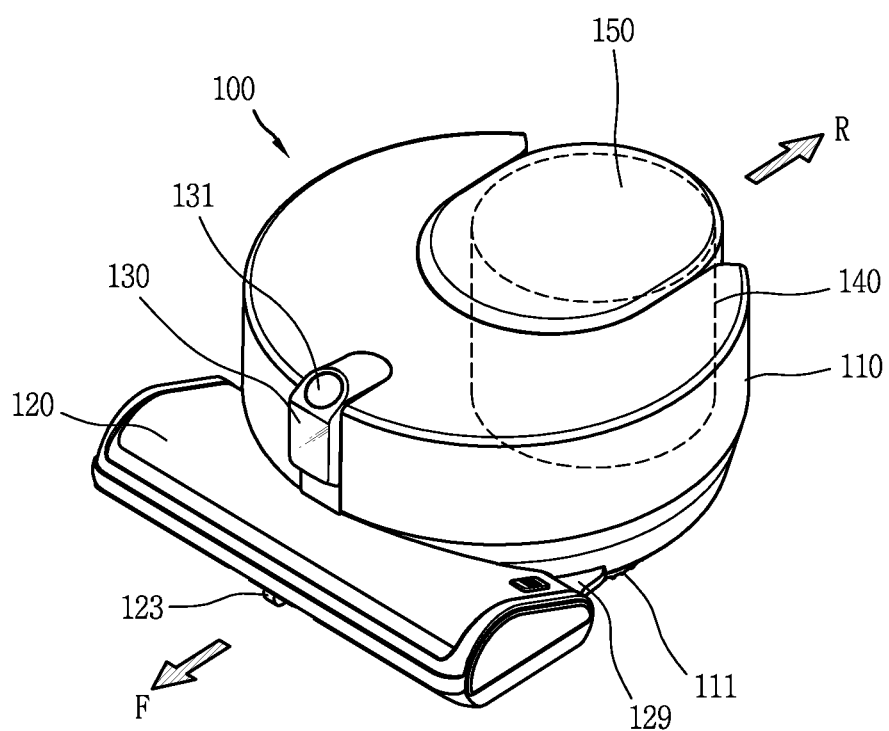
FIG. 1 is a perspective view showing an example of a mobile robot according to the present disclosure.
Figure 2:
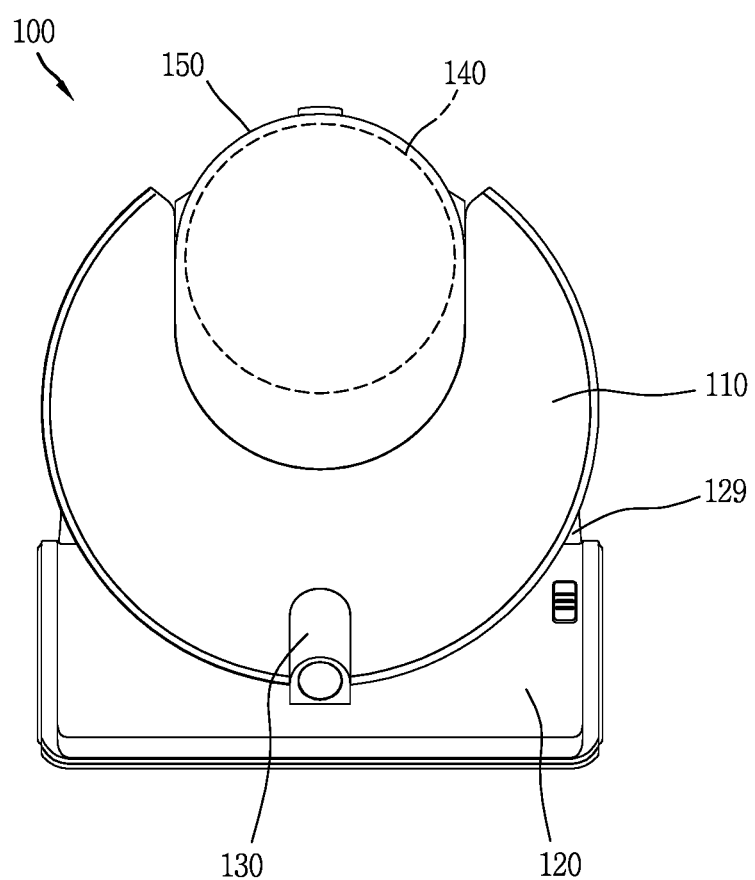
FIG. 2 is a plan view of the mobile robot illustrated in FIG. 1.
Figure 3:
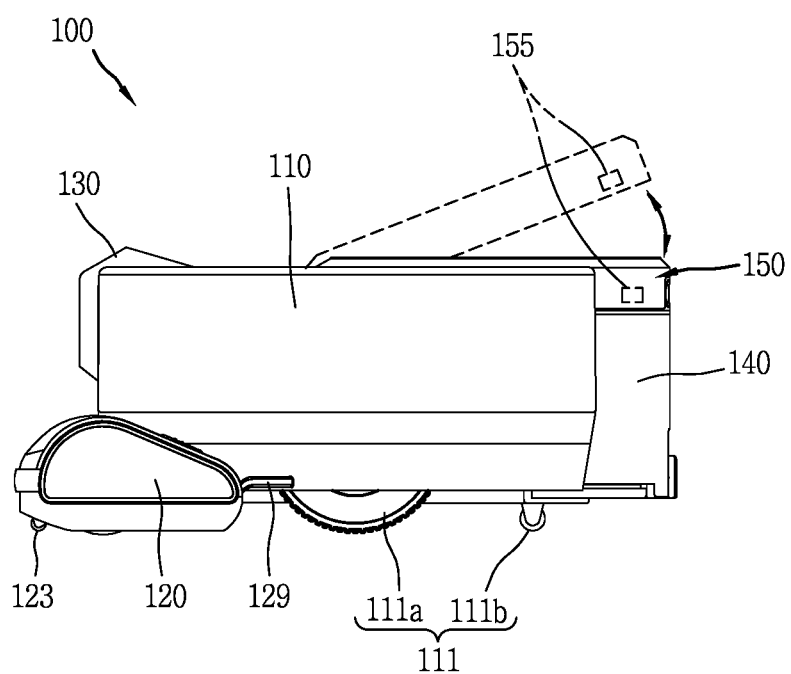
FIG. 3 is a side view of the mobile robot illustrated in FIG. 1.

FIGS. 1 to 3 illustrate a robot cleaner as an example of a mobile robot according to the present disclosure.

Specifically, FIG. 1 is a perspective view showing an example of a mobile robot 100 according to the present disclosure, and FIG. 2 is a plan view of the mobile robot 100 illustrated in FIG. 1, and FIG. 3 is a side view of the mobile robot 100 illustrated in FIG. 1.

In this specification, a mobile robot, a robot cleaner, and a cleaner that performs autonomous moving may be used in the same sense. Furthermore, in this specification, a plurality of cleaners described as an example of a plurality of mobile robots may include at least part of configurations illustrated in FIGS. 1 to 3.

Referring to FIGS. 1 through 3, the robot cleaner 100 performs a function of cleaning a floor while moving on a predetermined area by itself. Cleaning of a floor mentioned here includes sucking dust (including foreign matter) on the floor or mopping the floor.

The robot cleaner 100 may include a cleaner main body 110, a cleaning unit 120, a sensing unit 130, and a dust container 140.

The cleaner main body 110 is provided with various components in addition to a controller (not illustrated) for controlling the robot cleaner 100. In addition, the cleaner main body 110 is provided with a wheel unit 111 for the moving of the robot cleaner 100. The robot cleaner 100 may move forward, backward, leftward and rightward by the wheel unit 111.

Referring to FIG. 3, the wheel unit 111 includes main wheels 111a and a sub wheel 111b.

The main wheels 111a are provided on both sides of the cleaner main body 110 and configured to be rotatable in one direction or another direction according to a control signal of the controller. Each of the main wheels 111a may be configured to be driven independently of each other. For example, each main wheel 111a may be driven by a different motor. Or each main wheel 111a may be driven by a plurality of different axes provided in one motor.

The sub wheel 111b is configured to support the cleaner body 110 along with the main wheel 111a and assist the moving of the robot cleaner 100 by the main wheel 111a. The sub wheel 111b may also be provided on a cleaning unit 120 to be described later.

The controller is configured to control the driving of the wheel unit 111 in such a manner that the robot cleaner 100 autonomously moves on the floor.

Meanwhile, a battery (not shown) for supplying power to the robot cleaner 100 is mounted on the cleaner body 110. The battery may be configured to be rechargeable, and configured to be detachable from a bottom portion of the cleaner body 110.

In FIG. 1, a cleaning unit 120 may be disposed in a protruding form from one side of the cleaner main body 110, so as to suck air containing dust or mop an area. The one side may be a side where the cleaner main body 110 moves in a forward direction F, that is, a front side of the cleaner main body 110.

In this drawing, the cleaning unit 120 is shown having a shape protruding from one side of the cleaner main body 110 to front and both left and right sides. Specifically, a front end portion of the cleaning unit 120 is disposed at a position spaced forward apart from the one side of the cleaner main body 110, and left and right end portions of the cleaning unit 120 are disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The vacant space is a space between both left and right end portions of the cleaner body 110 and both left and right end portions of the cleaning unit 120, and has a shape recessed in an inward direction of the robot cleaner 100.

When an obstacle is caught in the vacant space, the robot cleaner 100 may be blocked by an obstacle not to move. In order to prevent this, a cover member 129 may be disposed to cover at least part of the vacant space.

The cover member 129 may be provided on the cleaner main body 110 or the cleaning unit 120. According to the present embodiment, it is shown that the cover member 129 is formed in a protruding manner on both sides of a rear end portion of the cleaning unit 120, and disposed to cover an outer peripheral surface of the cleaner body 110.

The cover member 129 is disposed to fill at least part of the empty space, that is, the empty space between the cleaner main body 110 and the cleaning unit 120. This may result in realizing a structure capable of preventing an obstacle from being caught in the empty space, or to easily escape an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit 120 if the cover member 129 protrudes from the cleaner main body 110. According to this structure, when the cleaning unit 120 is impacted due to colliding with an obstacle, a part of the impact is transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user can mount the cleaning unit 120 on the cleaner main body 110 when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. In other words, as the cover member 129 is disposed to cover the outer circumferential surface of the cleaner main body 110, a relative position of the cleaning unit 120 with respect to the cleaner main body 110 may be determined.

The cleaning unit 120 may be provided with a castor 123. The castor 123 is configured to assist the moving of the robot cleaner 100, and also support the robot cleaner 100.

The cleaner main body 110 is provided with the sensing unit 130. As illustrated, the sensing unit 130 may be disposed on one side of the cleaner main body 110 where the cleaning unit 120 is located, that is, on a front side of the cleaner main body 110.

The sensing unit 130 may be disposed to overlap the cleaning unit 120 in an up and down direction of the cleaner main body 110. The sensing unit 130 is disposed at an upper portion of the cleaning unit 120 to sense an obstacle or geographic feature in front of the robot cleaner 100 so that the cleaning unit 120 positioned at the forefront of the robot cleaner 100 does not collide with the obstacle.

The sensing unit 130 may be configured to additionally perform another sensing function other than the sensing function.

By way of example, the sensing unit 130 may include a camera 131 for acquiring surrounding images. The camera 131 may include a lens and an image sensor. The camera 131 may convert a surrounding image of the cleaner main body 110 into an electrical signal that can be processed by the controller. For example, the camera 131 may transmit an electrical signal corresponding to an upward image to the controller. The electrical signal corresponding to the upward image may be used by the controller to detect the position of the cleaner main body 110.

In addition, the sensing unit 130 may detect obstacles such as walls, furniture, and cliffs on a moving surface or a moving path of the robot cleaner 100. Also, the sensing unit 130 may sense presence of a docking device that performs battery charging. Also, the sensing unit 130 may detect ceiling information so as to map a moving area or a cleaning area of the robot cleaner 100.

The cleaner main body 110 is provided with a dust container 140 detachably coupled thereto for separating and collecting dust from sucked air.

The dust container 140 is provided with a dust container cover 150 which covers the dust container 140. In an embodiment, the dust container cover 150 may be coupled to the cleaner main body 110 by a hinge to be rotatable. The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 protrudes toward the rear of the cleaner main body 110 (i.e., a reverse direction R opposite to a forward direction F).

The dust container 140 is provided with an inlet through which air containing dust is introduced and an outlet through which air separated from dust is discharged. The inlet and the outlet communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 flows into the dust container 140 through the intake passage inside the cleaner main body 110 and the air is separated from the dust while passing through a filter and cyclone of the dust container 140. Dust is collected in the dust box 140, and air is discharged from the dust box 140 and then discharged to the outside through the discharge port 112 in the cleaner body 110 and finally through the discharge port 112.

An embodiment related to the components of the robot cleaner 100 will be described below with reference to FIG. 4.

The robot cleaner 100 or the mobile robot according to an embodiment of the present disclosure may include a communication unit 1100, an input unit 1200, a traveling unit 1300, a sensing unit 1400, an output unit 1500, a power supply unit 1600, a memory 1700, a controller 1800, and a cleaning unit 1900, or a combination thereof.

Figure 4:
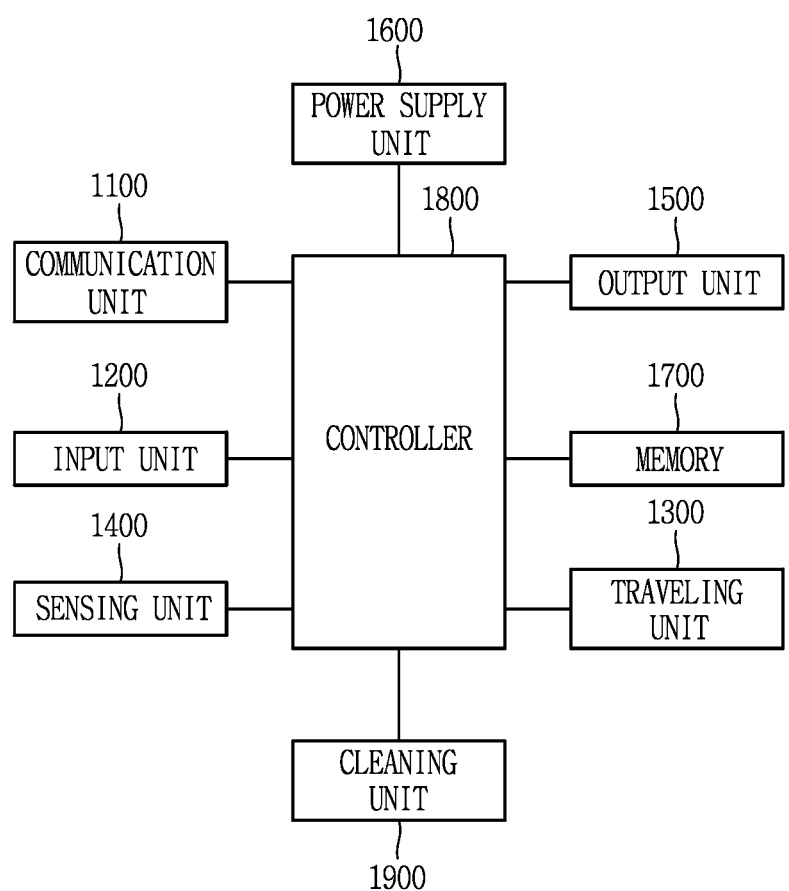
FIG. 4 is a block diagram showing exemplary components of a mobile robot according to an embodiment of the present disclosure.

Here, it is needless to say that the components shown in FIG. 4 are not essential, and thus a robot cleaner having more or fewer components than shown in FIG. 4 may be implemented. Also, as described above, each of a plurality of robot cleaners described in the present disclosure may equally include only some of components to be described below. In other words, a plurality of robot cleaners may include different components.

Hereinafter, each component will be described.

First, the power supply unit 1600 includes a battery that can be charged by an external commercial power source to supply power to the mobile robot. The power supply unit 1600 supplies driving power to each of the components included in the mobile robot to supply operating power required for the mobile robot to move or perform a specific function.

Here, the controller 1800 may sense the remaining power of the battery, and control the battery 1800 to move power to a charging base connected to the external commercial power source when the remaining power is insufficient, and thus a charge current may be supplied from the charging base to charge the battery. The battery may be connected to a battery sensing unit, and a battery remaining amount and a charging state may be delivered to the controller 1800. The output unit 1500 may display the remaining battery level under the control of the controller.

The battery may be located in a lower portion of the center of the robot cleaner or may be located at either one of the left and right sides. In the latter case, the mobile robot may further include a balance weight for eliminating a weight bias of the battery.

The controller 1800 performs a role of processing information based on an artificial intelligence technology and may include at least one module for performing at least one of learning of information, inference of information, perception of information, and processing of a natural language.

The controller 1800 may use a machine learning technology to perform at least one of learning, inference and processing of a large amount of information (big data), such as information stored in the cleaner, environment information around the cleaner, information stored in a communicable external storage, and the like. Furthermore, the controller 1800 may predict (or infer) at least one executable operation of the cleaner based on information learned using the machine learning technology, and control the cleaner to execute the most feasible operation among the at least one predicted operation.

The machine learning technology is a technology that collects and learns a large amount of information based on at least one algorithm, and determines and predicts information based on the learned information. The learning of information is an operation of grasping characteristics of information, rules and judgment criteria, quantifying a relation between information and information, and predicting new data using the quantified patterns.

Algorithms used by the machine learning technology may be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, and the like.

As one field of the machine learning technology, deep learning is a technology of performing at least one of learning, determining, and processing information using a deep neural network (DNN) algorithm. The deep neural network (DNN) may have a structure of linking layers and transferring data between the layers. This deep learning technology may be employed to learn a vast amount of information through the deep neural network (DNN) using a graphic processing unit (GPU) optimized for parallel computing.

The controller 1800 may use training data stored in an external server or a memory, and may include a learning engine for detecting a characteristic for recognizing a predetermined object. Here, characteristics for recognizing an object may include the size, shape, and shade of the object.

Specifically, when the controller 1800 inputs a part of images acquired through the camera provided on the cleaner into the learning engine, the learning engine may recognize at least one object or organism included in the input images.

When the learning engine is applied to moving of the cleaner, the controller 1800 can recognize whether or not an obstacle such as a chair leg, a fan, and a specific shape of balcony gap, which obstruct the running of the cleaner, exists around the cleaner. This may result in enhancing efficiency and reliability of the moving of the cleaner.

On the other hand, the learning engine may be mounted on the controller 1800 or on an external server. When the learning engine is mounted on an external server, the controller 1800 may control the communication unit 1100 to transmit at least one image that is subjected to analysis to the external server.

The external server may input an image received from the cleaner to the learning engine, thereby recognizing at least one object or creature included in the relevant image. In addition, the external server may transmit information related to the recognition result back to the cleaner. Here, the information related to the recognition result may include information related to a number of objects, a name of each object, included in the image that is subjected to analysis.

On the other hand, the traveling unit 1300 may include a motor, and operate the motor to bidirectionally rotate left and right main wheels, so that the main body can rotate or move. At this time, the left and right main wheels may be independently moved. The traveling unit 1300 may advance the main body of the mobile robot forward, backward, left, right, curvedly, or in place.

Meanwhile, the input unit 1200 receives various control commands for the robot cleaner from the user. The input unit 1200 may include one or more buttons, for example, the input unit 1200 may include an OK button, a set button, and the like. The OK button is a button for receiving a command for confirming sensing information, obstacle information, position information, and map information from the user, and the set button is a button for receiving a command for setting the information from the user.

In addition, the input unit 1200 may include an input reset button for canceling a previous user input and receiving a user input again, a delete button for deleting a preset user input, a button for setting or changing an operation mode, a button for receiving a command to be restored to the charging base, and the like.

Furthermore, the input unit 1200, such as a hard key, a soft key, a touch pad, or the like, may be installed on a upper portion of the mobile robot. In addition, the input unit 1200 may have a form of a touch screen along with the output unit 1500.

On the other hand, the output unit 1500 may be installed on an upper portion of the mobile robot. Of course, the installation location and installation type may vary. For example, the output unit 1500 may display a battery state, a moving mode, and the like on the screen.

In addition, the output unit 1500 may output state information inside the mobile robot detected by the sensing unit 1400, for example, a current state of each configuration included in the mobile robot. Moreover, the output unit 1500 may display external state information, obstacle information, position information, map information, and the like detected by the sensing unit 1400 on the screen. The output unit 1500 may be formed with any one of a light emitting diode (LED), a liquid crystal display (LCD), a plasma display panel, and an organic light emitting diode (OLED).

The output unit 1500 may further include a sound output device for audibly outputting an operation process or an operation result of the mobile robot performed by the controller 1800. For example, the output unit 1500 may output a warning sound to the outside in accordance with a warning signal generated by the controller 1800.

In this case, the audio output module (not shown) may be means, such as a beeper, a speaker or the like for outputting sounds, and the output unit 1500 may output sounds to the outside through the audio output module using audio data or message data having a predetermined pattern stored in the memory 1700.

Accordingly, the mobile robot according to an embodiment of the present disclosure may output environment information on a moving area on the screen or output it as sound. According to another embodiment, the mobile robot may transmit map information or environment information to a terminal device through the communication unit 1100 to output a screen or sound to be output through the output unit 1500.

The memory 1700 stores a control program for controlling or driving the robot cleaner and the resultant data. The memory 1700 may store audio information, image information, obstacle information, position information, map information, and the like. Furthermore, the memory 1700 may store information related to a moving pattern.

The memory 1700 mainly uses a nonvolatile memory. Here, the non-volatile memory (NVM, NVRAM) is a storage device capable of continuously storing information even when power is not supplied thereto, and for an example, the non-volatile memory may be a ROM, a flash memory, a magnetic computer storage device (e.g., a hard disk, a diskette drive, a magnetic tape), an optical disk drive, a magnetic RAM, a PRAM, and the like.

Meanwhile, the sensing unit 1400 may include at least one of an external signal detection sensor, a front detection sensor, a cliff detection sensor, a two-dimensional camera sensor, and a three-dimensional camera sensor.

The external signal detection sensor may sense an external signal of the mobile robot. The external signal detection sensor may be, for example, an infrared ray sensor, an ultrasonic sensor, an radio frequency (RF) sensor, or the like.

The mobile robot may receive a guide signal generated by the charging base using the external signal detection sensor to check the position and direction of the charging base. At this time, the charging base may transmit a guide signal indicating the direction and the distance to allow the mobile robot to return. In other words, the mobile robot may receive a signal transmitted from the charging base to determine a current position, set a moving direction, and return to the charging base.

On the other hand, the front detection sensor may be installed at predetermined intervals at a front side of the mobile robot, specifically along a lateral outer circumferential surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the controller 1800. In other words, the front sensor may detect protrusions on the moving path of the mobile robot, household appliances, furniture, walls, wall corners, and the like, and transmit the information to the controller 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be mainly used to sense a distant obstacle in general. The ultrasonic sensor may include a transmitter and a receiver, and the controller 1800 may determine whether or not there exists an obstacle based on whether or not ultrasonic waves radiated through the transmitter is reflected by the obstacle or the like and received at the receiver, and calculate a distance to the obstacle using the ultrasonic emission time and ultrasonic reception time.

Furthermore, the controller 1800 may compare ultrasonic waves emitted from the transmitter and ultrasonic waves received at the receiver to detect information related to a size of the obstacle. For example, the controller 1800 may determine that the larger the obstacle is, the more ultrasonic waves are received at the receiver.

In one embodiment, a plurality of (for example, five) ultrasonic sensors may be provided along a lateral outer circumferential surface at a front side of the mobile robot. At this time, the ultrasonic sensors may preferably be installed on the front surface of the mobile robot in a manner that the transmitter and the receiver are alternately arranged.

In other words, the transmitters may be spaced apart from the front center of the main body to the left and right sides, and one or two (or more) transmitters may be disposed between the receivers to form a receiving area of ultrasonic signals reflected from an obstacle or the like. With this arrangement, the receiving area may be expanded while reducing the number of sensors. A transmission angle of ultrasonic waves may maintain a range of angles that do not affect different signals to prevent a crosstalk phenomenon. Furthermore, the receiving sensitivities of the receivers may be set to be different from each other.

In addition, the ultrasonic sensor may be installed upward by a predetermined angle to output ultrasonic waves transmitted from the ultrasonic sensor in an upward direction, and here, the ultrasonic sensor may further include a predetermined blocking member to prevent ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the mobile robot together with the ultrasonic sensor. The infrared sensor may also sense an obstacle existing at the front or the side to transmit obstacle information to the controller 1800. In other words, the infrared sensor may sense a protrusion on the moving path of the mobile robot, a household appliance, a furniture, a wall, a wall corner, and the like, and transmit the information to the controller 1800. Therefore, the mobile robot may move within a specific region without collision with the obstacle.

On the other hand, a cliff detection sensor (or cliff sensor) may sense an obstacle on the floor supporting the main body of the mobile robot mainly using various types of optical sensors.

In other words, the cliff detection sensor may be installed on a rear surface of the bottom mobile robot, but may of course be installed in a different position depending on the type of the mobile robot. The cliff detection sensor is a sensor located on a back surface of the mobile robot to sense an obstacle on the floor, and the cliff detection sensor may be an infrared sensor, an ultrasonic sensor, an RF sensor, a PSD (Position Sensitive Detector) sensor, or the like, which is provided with a transmitter and a receiver such as the obstacle detection sensor.

For an example, any one of the cliff detection sensors may be installed in front of the mobile robot, and the other two cliff detection sensors may be installed relatively behind.

For example, the cliff detection sensor may be a PSD sensor, but may also be configured with a plurality of different kinds of sensors.

The PSD sensor detects a short and long distance position of incident light with one p-n junction using a semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. The PSD sensor is a type of infrared sensor that uses infrared rays to transmit infrared rays and then measure an angle of infrared rays reflected from and returned back to an obstacle so as to measure a distance. In other words, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The cleaning unit 1900 cleans a designated cleaning area according to a control command transmitted from the controller 1800. The cleaning unit 1900 scatters dust in the vicinity through a brush (not shown) that scatters dust in a designated cleaning area, and then drives the suction fan and the suction motor to suck the scattered dust. In addition, the cleaning unit 1900 may perform mopping in a designated cleaning area according to the replacement of the configuration.

Furthermore, the controller 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the controller 1800 may determine whether to pass a cliff or not according to a ground state of the detected cliff by using the cliff detection sensor, and decide whether to pass the cliff or not according to the determination result. For example, the controller 1800 determines presence or non-presence of a cliff and a depth of the cliff through the cliff sensor, and then allows the mobile robot to pass through the cliff only when a reflection signal is detected through the cliff sensor.

As another example, the controller 1800 may also determine lifting of the mobile robot using the cliff sensor.

On the other hand, the two-dimensional camera sensor is provided on one side of the mobile robot to acquire image information related to the surroundings of the main body during movement.

An optical flow sensor converts a downward image input from an image sensor provided in the sensor to generate image data in a predetermined format. The generated image data may be stored in the memory 1700.

Furthermore, one or more light sources may be installed adjacent to the optical flow sensor. The one or more light sources irradiate light to a predetermined region of the bottom surface captured by the image sensor. In other words, when the mobile robot moves in a specific region along the bottom surface, a predetermined distance is maintained between the image sensor and the bottom surface when the bottom surface is flat. On the other hand, when the mobile robot moves on a bottom surface having a nonuniform surface, the robot moves away from the bottom surface by more than a predetermined distance due to the irregularities of the bottom surface and obstacles. At this time, the one or more light sources may be controlled by the controller 1800 to adjust an amount of light to be irradiated. The light source may be a light emitting device capable of controlling the amount of light, for example, a light emitting diode (LED) or the like.

Using the optical flow sensor, the controller 1800 may detect a position of the mobile robot irrespective of the slip of the mobile robot. The controller 1800 may compare and analyze the image data captured by the optical flow sensor over time to calculate the moving distance and the moving direction, and calculate the position of the mobile robot on the basis of the moving distance and the moving direction. Using image information on a bottom side of the mobile robot using the optical flow sensor, the controller 1800 may perform slip-resistant correction on the position of the mobile robot calculated by another device.

The three-dimensional camera sensor may be attached to one side or a part of the main body of the mobile robot to generate three-dimensional coordinate information related to the surroundings of the main body.

In other words, the three-dimensional camera sensor may be a 3D depth camera that calculates a near and far distance of the mobile robot and an object to be captured.

Specifically, the three-dimensional camera sensor may capture a two-dimensional image related to the surroundings of the main body, and generate a plurality of three-dimensional coordinate information corresponding to the captured two-dimensional image.

In one embodiment, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the embodiment may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of a region where light of the first pattern and light of the second pattern are incident.

In another embodiment, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another embodiment, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor is configured to irradiate a laser beam in the form of extending in at least one direction. In one example, the three-dimensional camera sensor may include first and second lasers, wherein the first laser irradiates a linear shaped laser intersecting each other, and the second laser irradiates a single linear shaped laser. According to this, the lowermost laser is used to sense obstacles in the bottom portion, the uppermost laser is used to sense obstacles in the upper portion, and the intermediate laser between the lowermost laser and the uppermost laser is used to sense obstacles in the middle portion.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another located in a specific area. Here, the another device may be any device capable of connecting to a network to transmit and receive data, and for example, the device may be an air conditioner, a heating device, an air purification device, a lamp, a TV, an automobile, or the like. The another device may also be a device for controlling a door, a window, a water supply valve, a gas valve, or the like. The another device may be a sensor for sensing temperature, humidity, air pressure, gas, or the like.

Further, the communication unit 1100 may communicate with another robot cleaner 100 located in a specific area or within a predetermined range.

Figure 5A:
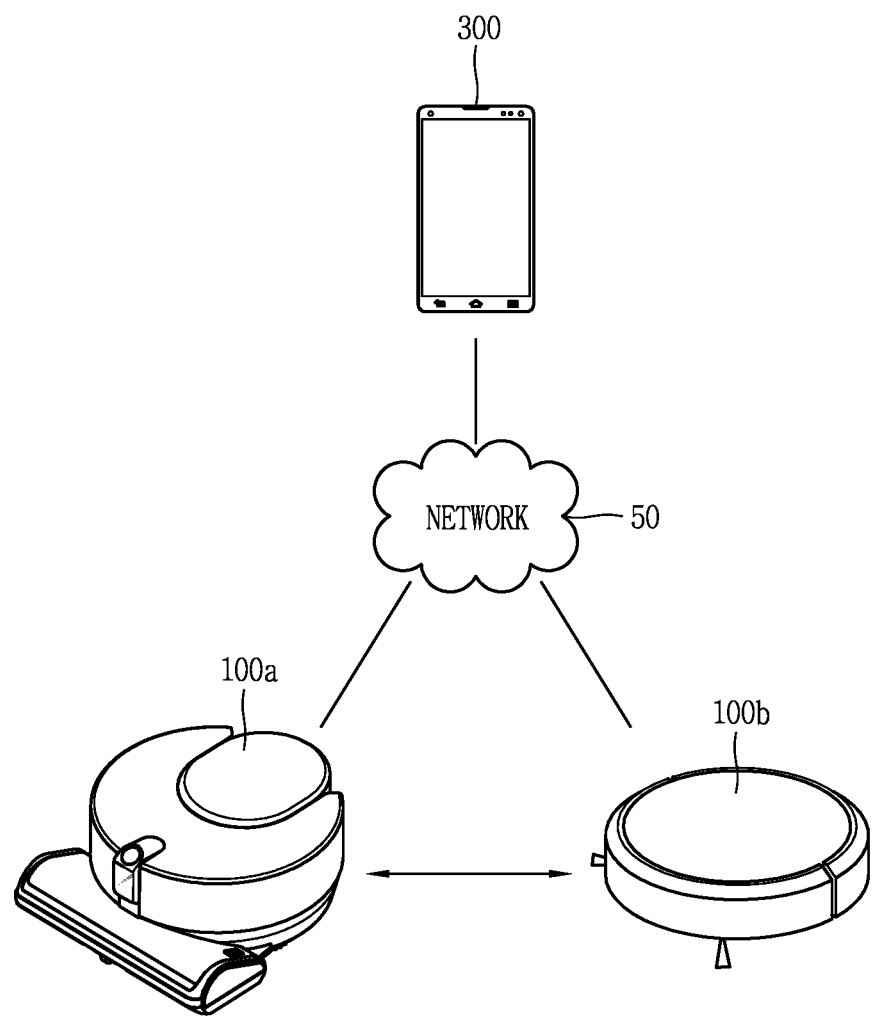
FIG. 5A is a conceptual view illustrating network communication between a plurality of mobile robots according to an embodiment of the present disclosure.
Figure 5B:
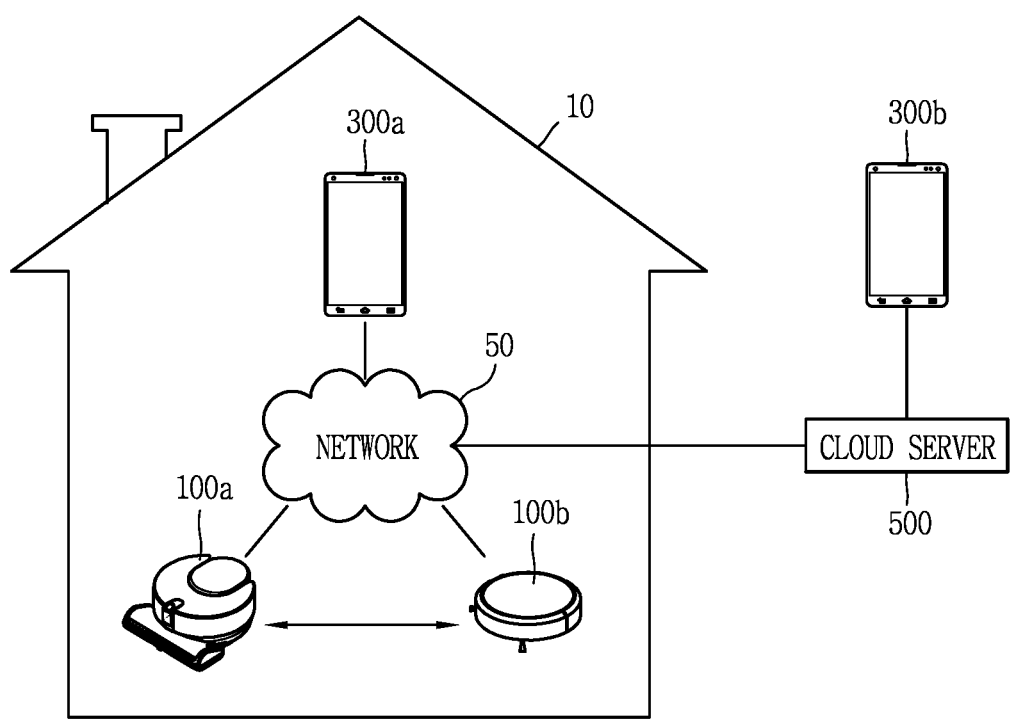
FIG. 5B is a conceptual view illustrating an example of the network communication of FIG. 5A.

Referring to FIGS. 5A and 5B, a first cleaner 100a and a second cleaner 100b that perform autonomous moving may exchange data with each other through network communication 50. In addition, the first cleaner 100a and/or the second cleaner 100b that perform autonomous moving may perform a cleaning related operation or a corresponding operation by a control command received from a terminal 300 through the network communication 50 or other communication.

In other words, although not shown, a plurality of cleaners 100a, 100b that perform autonomous moving may also perform communication with the terminal 300 through a first network communication and perform communication with each other through a second network communication.

Here, the network communication 50 may refer to short-range communication using at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (USB), and the like.

The network communication 50 may vary depending on a communication mode of the robot cleaners desired to communicate with each other.

In FIG. 5A, the first cleaner 100a and/or the second cleaner 100b that perform autonomous moving may provide information sensed by the respective sensing units thereof to the terminal 300 through the network communication 50. The terminal 300 may also transmit a control command generated based on the received information to the first cleaner 100a and/or the second cleaner 100b via the network communication 50.

In FIG. 5A, the communication unit of the first cleaner 100a and the communication unit of the second cleaner 100b may also directly communicate with each other or indirectly communicate with each other via another router (not shown), to recognize information related to a moving state and positions of counterparts.

In one example, the second cleaner 100b may perform a moving operation and a cleaning operation according to a control command received from the first cleaner 100a. In this case, it may be said that the first cleaner 100a operates as a master and the second cleaner 100b operates as a slave. Alternatively, it may be said that the second cleaner 100b follows the first cleaner 100a. In some cases, it may also be said that the first cleaner 100a and the second cleaner 100b collaborate with each other.

Hereinafter, a system including a plurality of cleaners 100a, 100b performing autonomous moving according to an embodiment of the present disclosure will be described with reference to FIG. 5B.

As illustrated in FIG. 5B, a cleaning system according to an embodiment of the present disclosure may include a plurality of cleaners 100a, 100b performing autonomous moving, a network 50, a server 500, and a plurality of terminals 300a and 300b.

The plurality of cleaners 100a, 100b, the network 50 and at least one terminal 300a may be disposed in a building 10 while another terminal 300b and the server 500 may be located outside the building 10.

The plurality of cleaners 100a, 100b are cleaners that perform cleaning while moving by themselves, and may perform autonomous moving and autonomous cleaning. Each of the plurality of cleaners 100a, 100b may include a communication unit 1100, in addition to the moving function and the cleaning function.

The plurality of cleaners 100a, 100b, the server 500 and the plurality of terminals 300a and 300b may be connected together through the network 50 to exchange data. To this end, although not shown, a wireless router such as an access point (AP) device and the like may further be provided. In this case, the terminal 300a located in the building (internal network) 10 may access at least one of the plurality of cleaners 100a, 100b through the AP device so as to perform monitoring, remote control and the like with respect to the cleaner. Also, the terminal 300b located in an external network may access at least one of the plurality of cleaners 100a, 100b through the AP device, to perform monitoring, remote control and the like with respect to the cleaner.

The server 500 may be wirelessly connected directly through the terminal 300b. Alternatively, the server 500 may be connected to at least one of the plurality of cleaners 100a, 100b without passing through the mobile terminal 300b.

The server 500 may include a programmable processor and may include various algorithms. By way of example, the server 500 may be provided with algorithms related to performing machine learning and/or data mining. As an example, the server 500 may include a speech recognition algorithm. In this case, when receiving voice data, the received voice data may be output by being converted into data in a text format.

The server 500 may store firmware information, operation information (course information and the like) related to the plurality of cleaners 100a, 100b, and may register product information regarding the plurality of cleaners 100a, 100b. For example, the server 500 may be a server operated by a cleaner manufacturer or a server operated by an open application store operator.

In another example, the server 500 may be a home server that is provided in the internal network 10 and stores status information regarding the home appliances or stores contents shared by the home appliances. If the server 500 is a home server, information related to foreign substances, for example, foreign substance images and the like may be stored.

Meanwhile, the plurality of cleaners 100a, 100b may be directly connected to each other wirelessly via Zigbee, Z-wave, Blue-Tooth, Ultra-wide band, and the like. In this case, the plurality of cleaners 100a, 100b may exchange position information and moving information with each other.

At this time, any one of the plurality of cleaners 100a, 100b may be a master cleaner 100a and another may be a slave cleaner 100b. For example, the first cleaner 100a may be a dry cleaner that sucks dust on the cleaning floor, and the second cleaner 100b may be a wet cleaner that mops the floor cleaned by the first cleaner 100a. Furthermore, the structures and specifications of the first cleaner 100a and the second cleaner 100b may be different from each other.

In this case, the first cleaner 100a may control the moving and cleaning of the second cleaner 100b. In addition, the second cleaner 100b may perform moving and cleaning while following the first cleaner 100a. Here, an operation in which the second cleaner 100b follows the first cleaner 100a refers to an operation in which the second cleaner 100b performs moving and cleaning by following the first cleaner 100*a* while maintaining a proper distance from the first cleaner 100*a*.

Figure 5C:
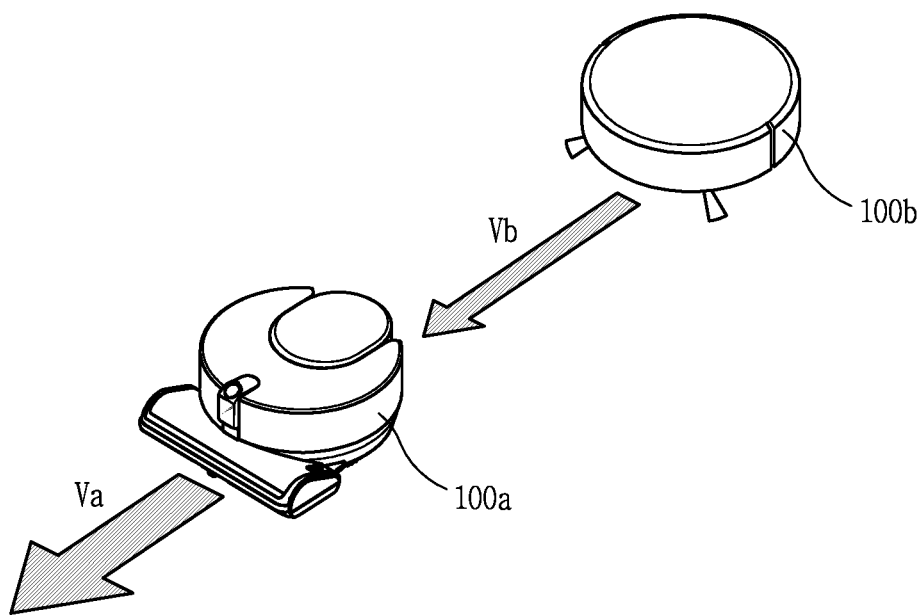
FIG. 5C is a conceptual view illustrating follow-up moving among a plurality of mobile robots according to an embodiment of the present disclosure.

Referring to FIG. 5C, the first cleaner 100*a* may control the second cleaner 100*b* such that the second cleaner 100*b* follows the first cleaner 100*a*.

For this purpose, the first cleaner 100*a* and the second cleaner 100*b* should exist in a specific area where they can communicate with each other, and the second cleaner 100*b* should recognize at least a relative position of the first cleaner 100*a*.

For example, the communication unit of the first cleaner 100*a* and the communication unit of the second cleaner 100*b* exchange IR signals, ultrasonic signals, carrier frequencies, impulse signals, and the like, and analyze them through triangulation, so as to calculate movement displacements of the first cleaner 100*a* and the second cleaner 100*b*, thereby recognizing relative positions of the first cleaner 100*a* and the second cleaner 100*b*. However, the present disclosure is not limited to this method, and one of the various wireless communication technologies described above may be used to recognize the relative positions of the first cleaner 100*a* and the second cleaner 100*b* through triangulation or the like. This will be described in more detail below.

When the first cleaner 100*a* recognizes the relative position with the second cleaner 100*b*, the second cleaner 100*b* may be controlled based on map information stored in the first cleaner 100*a* or map information stored in the server, the terminal or the like. In addition, the second cleaner 100*b* may share obstacle information sensed by the first cleaner 100*a*. The second cleaner 100*b* may perform an operation based on a control command (for example, a control command related to a moving direction, a moving speed, a stop, etc.) received from the first cleaner 100*a*.

Specifically, the second cleaner 100*b* performs cleaning while moving along a moving path of the first cleaner 100*a*. However, the moving directions of the first cleaner 100*a* and the second cleaner 100*b* do not always coincide with each other. For example, when the first cleaner 100*a* moves or rotates up/down/right/left, the second cleaner 100*b* may move or rotate up/down/right/left after a predetermined time, and thus current advancing directions of the first and second mobile robot 100*a*, 100*b* may differ from each other.

Also, a moving speed (Va) of the first cleaner 100*a* and a moving speed (Vb) of the second cleaner 100*b* may be different from each other.

The first mobile robot 100*a* may control the moving speed (Vb) of the second mobile robot 100*b* to vary in consideration of a distance at which the first mobile robot 100*a* and the second mobile robot 100*b* can communicate with each other. For example, if the first cleaner 100*a* and the second cleaner 100*b* move away from each other by a predetermined distance or more, the first cleaner 100*a* may control the moving speed (Vb) of the second cleaner 100*b* to be faster than before. On the other hand, when the first cleaner 100*a* and the second cleaner 100*b* move close to each other by a predetermined distance or less, the first cleaner 100*a* may control the moving speed (Vb) of the second cleaner 100*b* to be slower than before or control the second cleaner 100*b* to stop for a predetermined time. Accordingly, the second cleaner 100*b* can perform cleaning while continuously following the first cleaner 100*a*.

FIGS. 6, 7, 8A, 8B and 8C are views for specifically explaining a method of more flexibly performing follow-up while a plurality of mobile robots 100*a*, 100*b* according to an embodiment of the present disclosure maintain a predetermined distance from one another.

First, referring to FIG. 6, the concept of virtual impedance control applied to the present disclosure to allow the second cleaner 100*b* to follow the first cleaner 100*a* while the plurality of cleaners 100*a*, 100*b* avoid an obstacle without sudden acceleration/stop will be described.

Figure 6:
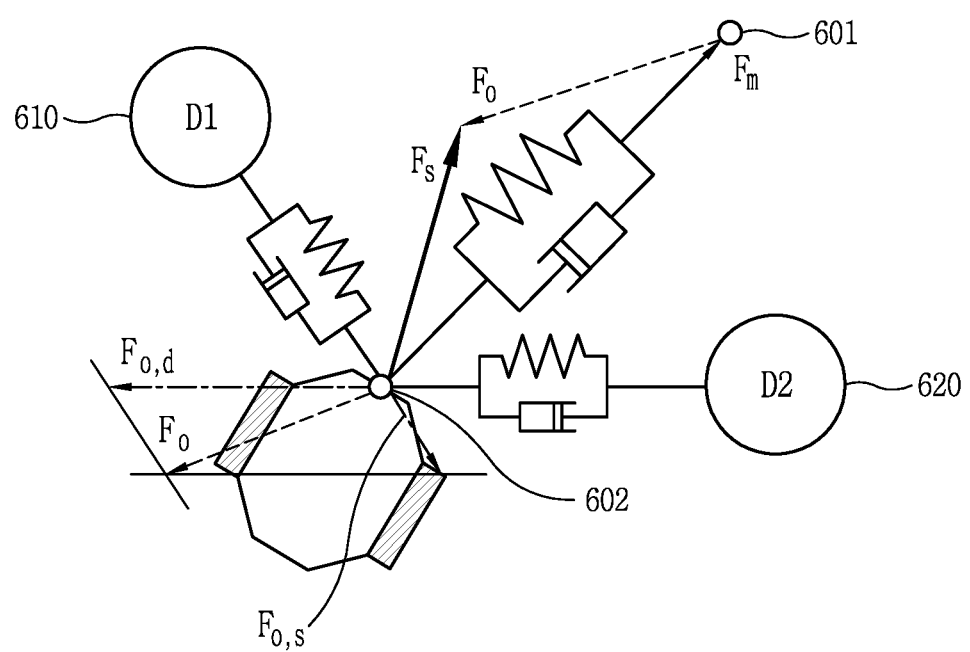

In FIG. 6, it may be assumed that the mobile robot performs cleaning while moving from a first position 602 toward a second position 601. At this time, it may also be said that a mobile robot existing at the first position 602 follows another mobile robot existing at the second position 601.

When a mobile robot existing at the first position 602 follows another mobile robot existing at the second position 601, a plurality of obstacles (D1, D2) may exist within or in the vicinity of a moving path of the mobile robot. Here, either one (D1) of the plurality of obstacles (D1, D2) may be a fixed obstacle and the other one (D2) may be a moving obstacle.

The mobile robot may be provided with an obstacle sensor for sensing the plurality of obstacles (D1, D2). The obstacle sensors may be arranged at regular intervals along a side outer circumferential surface of the mobile robot, for example. The obstacle sensor may transmit a signal such as IR, ultrasonic waves and radio waves toward the plurality of obstacles (D1, D2) and receive a signal reflected from the plurality of obstacles (D1, D2) to determine a position of and a distance to the obstacle.

Virtual impedance control is a concept of modeling a relative distance and relative speed between the mobile robot and the obstacles (D1, D2) using a spring-damper, and then using the relationship of these forces to perform moving and follow-up while flexibly avoid obstacles.

Specifically, it is assumed that a repulsive force (F0) is generated between the mobile robot and the plurality of obstacles (D1, D2), and an attractive force (Fm) acts between the mobile robot and the second position 601 or the mobile robot at the first position 602 and another mobile robot at the second position 601, and an actual moving direction of the mobile robot is determined in the direction of a composite vector (Fs) of the repulsive force (F0) and the attractive force (Fm).

For example, in FIG. 6, under the assumption that there are springs and dampers between the plurality of obstacles (D1, D2) and the obstacle sensor, and respective distances from the plurality of obstacles (D1, D2) may be put into the springs, and respective speeds may be put into the dampers to calculate repulsive forces between the plurality of obstacles (D1, D2) and the cleaner.

To this end, 1) an attractive force (Fm) is calculated using a separation distance and speed difference from the mobile robot at the first position 602 at the head of the mobile robot at the second position 601. Next, 2) a first repulsive force (Fo, s) is obtained using a separation distance and speed difference between the first obstacle 610 and the mobile robot 602, and a second repulsive force (Fo, d) is obtained using a separation distance and speed difference between the second obstacle 620 and the mobile robot 602 to obtain a composite value (Fo) thereof. Then, 3) a repulsive force (Fo) obtained by combining the attractive force (Fm) and the previous composite value (Fo) is obtained. Finally, 4) the mobile robot moves in an Fs direction, which is a composite vector of the attractive force (Fm) calculated in the above 1) and the repulsive force composite value (Fo) calculated in the above 2).

On the other hand, in the foregoing concept of virtual impedance control, the mobile robot located at the front point 601, that is, the first cleaner 100*a*, actually continues to perform moving and cleaning, and continues to transmit information on the moving direction and the moving speed to the another mobile robot at the rear point 602, that is, the second cleaner 100b. In addition, the moving direction and moving speed of the first cleaner 100a may vary depending on the floor structure of the cleaning area, the dust condition, and the like.

When the first cleaner 100a and the second cleaner 100b perform cleaning independently, another cleaner may be regarded as an obstacle and only the repulsive force may be taken into account while moving. However, in the present disclosure, since the second cleaner 100b performs cleaning while following the first cleaner 100a, the attractive force (Fm) and the repulsive force (Fo) are alternately applied to the same object.

Specifically, while the second cleaner 100b follows the first cleaner 100a, the attractive force (Fm) and the repulsive force (Fo) may be alternated on the basis of the determined the follow-up distance.

In one example, the degree of alternation of the attractive force (Fm) and the repulsive force (Fo) may vary depending on the floor state of the cleaning area (e.g., inclination, flatness, presence of carpet, etc.), the presence of an obstacle, the dust state of a cleaning space (an area/spot requiring intensive cleaning), and the like.

Furthermore, here, the follow-up distance refers to a separation distance that must be maintained between the plurality of cleaners during follow-up. When a separation distance between the plurality of cleaners becomes too far from the follow-up distance, a relative position between each other may no longer be determined to discontinue the follow-up. On the contrary, when a separation distance between the plurality of cleaners becomes too small compared to the follow-up distance, the cleaners hit each other or suddenly stop to interfere with moving.

Accordingly, the controller of the first cleaner 100a may apply and control the attractive force (Fm) when a separation distance between the plurality of cleaners is within the follow-up distance or far from the follow-up distance, and apply and control the repulsive force (Fo) when the separation distance between the plurality of cleaners is within the follow-up distance.

The application of the attractive force (Fm) corresponds to the deceleration of the moving speed of the first cleaner 100a. Furthermore, the application of the repulsive force (Fo) corresponds to the acceleration of the moving speed of the first cleaner 100a.

To this end, each of the plurality of cleaners 100a, 100b may continuously measure a relative position (e.g., distance, direction, etc.) using triangulation techniques based on signals transmitted and received using an ultrasonic sensor, a BWM sensor, an IR sensor, and the like. In addition, the moving direction and the moving speed of the plurality of cleaners 100a, 100b, particularly, the first cleaner 100a at the head, are continuously calculated using signals exchanged at two different time points.

The moving speed of the first cleaner 100a may be calculated through the following equation.

$$V1 = V0 + k(Dmin - Dab)$$

Here, V0 is a basic moving speed of the first cleaner 100a, k is a proportional constant, Dmin is a follow-up distance, and Dab is a current separation distance between the plurality of cleaners 100a, 100b. Accordingly, the first cleaner 100a moves at a decelerate speed as a separation distance between the plurality of cleaners is larger than the follow-up distance, the first cleaner 100a accelerates when the separation distance between the plurality of cleaners decreased within the follow-up distance. Accordingly, the second cleaner 100b following the first cleaner 100a may not suddenly accelerate or stop abruptly.

As described above, according to the present disclosure, the repulsive force may be applied to an obstacle and the attractive force and the repulsive force may be alternately applied between the plurality of cleaners 100a, 100b according to the separation distance, thereby allowing obstacle avoidance as well as flexible follow-up without any interruption.

Hereinafter, a control method for flexible follow-up among a plurality of cleaners will be described in detail with reference to the flowchart of FIG. 7.

First, the communication unit of the first cleaner 100a and the communication unit of the second cleaner 100b are communicably connected to each other, and the process of recognizing a relative position between each other is started (S10).

Specifically, the first cleaner 100a and the second cleaner 100b transmit and receive signals to and from each other through an IR sensor, an ultrasonic sensor, a UWB sensor, or the like, disposed on a side outer circumferential surface of each cleaner or embedded in the main body to determine a direction and distance between each other. Since the foregoing sensor is a component for allowing the plurality of cleaners 100a, 100b to determine a relative position between each other, the sensor may be used in the same concept as the communication unit.

The first cleaner 100a and the second cleaner 100b respectively send and receive signals, and recognize a relative position between each other. Here, the signal may be any one of wireless communication signals using wireless communication technologies such as Zigbee, Z-wave, and Bluetooth, in addition to a ultra-wide band (UWB) signal, an infrared signal, a laser signal, and an ultrasound signal, for example.

The first cleaner 100a may transmit a first signal through the foregoing sensor and receive a second signal from the second cleaner 100b, thereby recognizing a relative position of the second cleaner 100b based on the first cleaner 100a.

Furthermore, the second cleaner 100b may transmit a second signal through the foregoing sensor and receive a first signal received from the first cleaner 100a, thereby recognizing a relative position of the first cleaner 100a based on the second cleaner 100b.

Specifically, for example, one UWB sensor may be provided in each of the plurality of cleaners 100a, 100b, or a single UWB sensor may be provided in the first cleaner 100a and at least two UWB sensors in the second cleaner 100b.

The UWB module (or UWB sensor) may be included in the communication units 1100 of the first cleaner 100a and the second cleaner 100b. In view of the fact that the UWB modules are used to sense the relative positions of the first cleaner 100a and the second cleaner 100b, the UWB modules may be included in the sensing units 1400 of the first cleaner 100a and the second cleaner 100b.

For example, the first cleaner 100a may include a UWB module for transmitting ultra-wide band signals. The transmitting UWB module may be termed as a second type transmitting sensor or a "UWB tag."

Furthermore, the second cleaner 100b may include a receiving UWB module for receiving ultra-wide band signals output from a transmitting UWB module provided in the first cleaner 100a. The receiving UWB module may be named as a second type receiving sensor or a "UWB anchor."

UWB signals transmitted/received between the UWB modules may be smoothly transmitted and received within a specific space. Accordingly, even if an obstacle exists between the first cleaner 100a and the second cleaner 100b, if the first cleaner 100a and the second cleaner 100b exist within a specific space, they can transmit and receive the UWB signals.

The first cleaner and the second cleaner may measure the time of a signal transmitted and received between the UWB tag and the UWB anchor to determine a separation distance between the first cleaner 100a and the second cleaner 100b.

Specifically, for example, each of the plurality of cleaners 100a, 100b may be provided with one UWB sensor, or the first cleaner 100a may be provided with a single UWB sensor, and the second cleaner 100b following the first cleaner 100a may be provided with a single UWB sensor and at least one antenna or provided with at least two UWB sensors, so that the first cleaner 100a can measure distances to the second cleaner 100b at two different time points (t1, t2).

The UWB sensor of the first cleaner 100a and the UWB sensor of the second cleaner 100b radiate UWB signals to each other, and measure distances and relative speed using Time of Arrival (ToA), which is a time that the signals come back by being reflected from the robots. However, the present disclosure is not limited to this, and may recognize the relative positions of the plurality of cleaners 100a, 100b using a Time Difference of Arrival (TDoA) or Angle of Arrival (AoA) positioning technique.

Specifically, description will be given of a method of determining the relative positions of the first cleaner 100a and the second cleaner 100b using an AoA positioning technique. In order to use the AoA (Angle of Arrival) positioning technique, each of the first cleaner 100a and the second cleaner 100b should be provided with one receiver antenna or a plurality of receiver antennas.

The first cleaner 100a and the second cleaner 100b may determine their relative positions using a difference of angles that the receiver antennas provided in the cleaners, respectively, receive signals. To this end, each of the first cleaner 100a and the second cleaner 100b must be able to sense an accurate signal direction coming from the receiver antenna array. Since signals, for example, UWB signals, generated in the first cleaner 100a and the second cleaner 100b, respectively, are received only in specific directional antennas, they can determine (recognize) received angles of the signals.

Under assumption that positions of the receiver antennas provided in the first cleaner 100a and the second cleaner 100b are known, the relative positions of the first cleaner 100a and the second cleaner 100b may be calculated based on signal receiving directions of the receiver antennas. At this time, if one receiver antenna is installed, a 2D position may be calculated in a space of a predetermined range. On the other hand, if at least two receiver antennas are installed, a 3D position may be determined. In the latter case, a distance d between the receiver antennas is used for position calculation in order to accurately determine a signal receiving direction.

Furthermore, the present disclosure may be implemented to determine a relative position of the second cleaner 100b only through the first cleaner 100a or calculate and determine a relative position of the first cleaner 100a only through the second cleaner 100b. In this implementation example, the first cleaner 100a may transmit information related to the relative position to the second cleaner 100b or the second cleaner 100b may transmit information related to the relative position to the first cleaner 100a.

As described above, according to the present disclosure, since the plurality of cleaners 100a, 100b may determine relative positions to each other, and thus follow-up control may be carried out without any interruption by determining the relative positions to each other irrespective of the communication state of the server.

In addition, the first cleaner 100a and the second cleaner 100b may share the moving state information and the map information with each other through the respective communication units. Moving state information, map information, obstacle information, and the like may typically be transmitted from the first cleaner 100a to the second cleaner 100b according to the follow-up relationship between the plurality of cleaners 100a, 100b, but information sensed by the second cleaner 100b, for example, new obstacle information, may also be transmitted to the first cleaner 100a.

Next, the second cleaner 100b performs cleaning while following the moving path of the first cleaner 100a (S20).

Specifically, the first cleaner 100a initially cleans a designated cleaning area, and the second cleaner 100b performs the cleaning while following the moving path through which the first cleaner 100a has passed. At this time, the second cleaner 100b may also perform cleaning while following the moving speed of the first cleaner 100a and the cleaning mode on the relevant path.

Meanwhile, in one example, the actual moving path of the second cleaner 100b may not coincide with the moving path of the first cleaner 100a.

For example, when an obstacle that was not detected when the first cleaner 100a had passed is newly sensed at the time when the second cleaner 100b passes, the moving path of the second cleaner 100b may be slightly different from the moving path of the first cleaner 100a. At this time, the first cleaner 100a may be followed from the closest position at the time of avoiding the new obstacle.

While the second cleaner 100b follows the first cleaner 100a, the first cleaner 100a continuously monitors a separation distance from the second cleaner 100b (S30).

The controller of the first cleaner 100a continuously monitors a relative position between the first cleaner 100a and the second cleaner 100b based on signal values acquired through sensors such as UWB sensors, IR sensors, ultrasonic sensors, and the like, respectively provided therein, and determines whether a separation distance corresponding to the relative position is moving away or getting closer.

According to the monitoring, the controller of the first cleaner 100a may determine whether a separation distance from the second cleaner 100b deviates from the critical follow-up distance (S40). At this time, the controller of the first cleaner 100a may determine a current moving speed of the first cleaner 100a.

Here, the critical follow-up distance denotes a four-way distance within a circle range smaller than a range where a plurality of cleaners can determine relative positions among one another by a predetermined value.

The critical follow-up distance may include a "minimum follow-up distance" at which the plurality of cleaners 100a, 100b can be maximally close to each other and a "maximum follow-up distance" at which the plurality of cleaners 100a, 100b can be maximally far away from each other. Therefore, whether or not to deviate from the critical follow-up distance may denote that the separation distance between the plurality of cleaners 100a, 100b is less than the minimum follow-up distance or greater than the maximum follow-up distance.

When the separation distance approaches the minimum follow-up distance, a repulsive force is applied between the first cleaner 100a and the second cleaner 100b so as to be controlled to move away from each other. Furthermore, the separation distance approaches the maximum follow-up distance, an attractive force is applied between the first cleaner 100a and the second cleaner 100b so as to be controlled to move closer to each other.

As a result of the determination, when the distance does not deviate from the critical follow-up distance, the process returns to step S20. Accordingly, the second cleaner 100b continues cleaning while following the first cleaner 100a.

As a result of the determination, when the distance deviates from or is expected to deviate from the critical follow-up distance, the controller of the first cleaner 100a varies the moving speed of the traveling unit of the first cleaner 100a or transmits a stop command to the second cleaner 100b (S50).

Figure 8A:
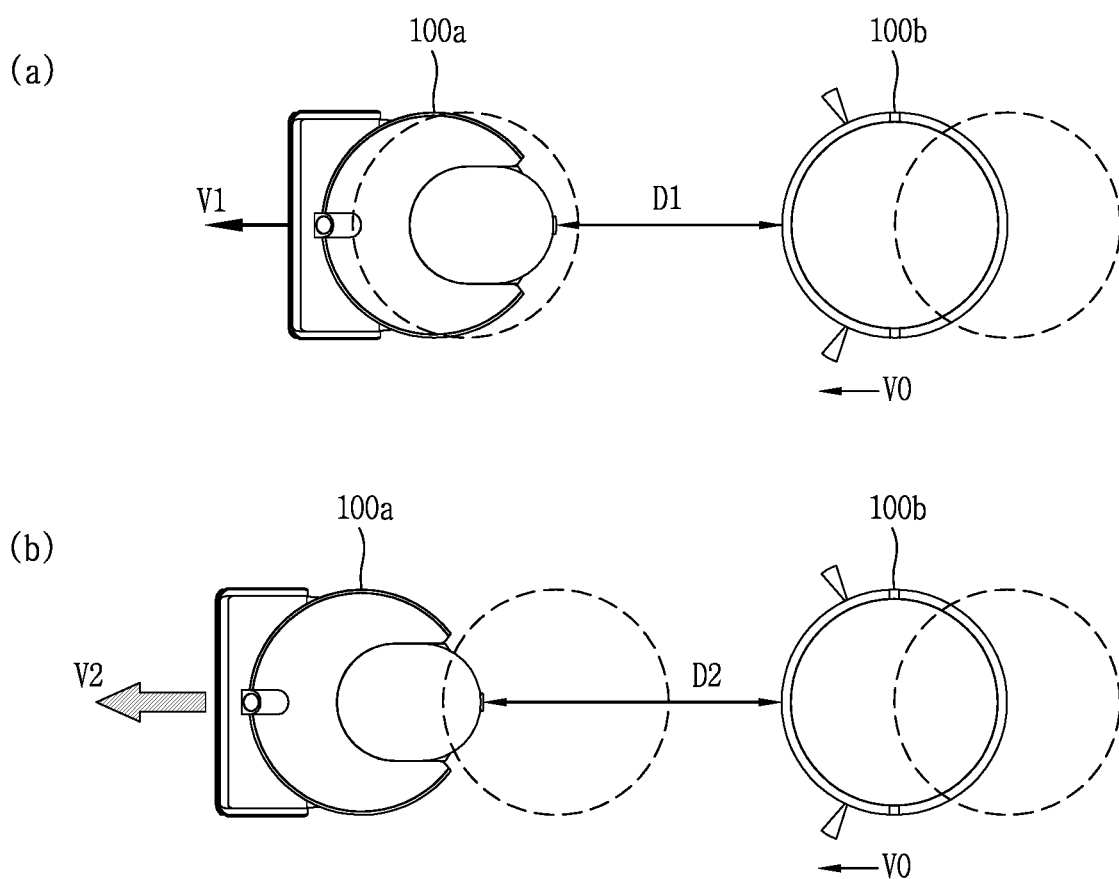
Figure 8B:
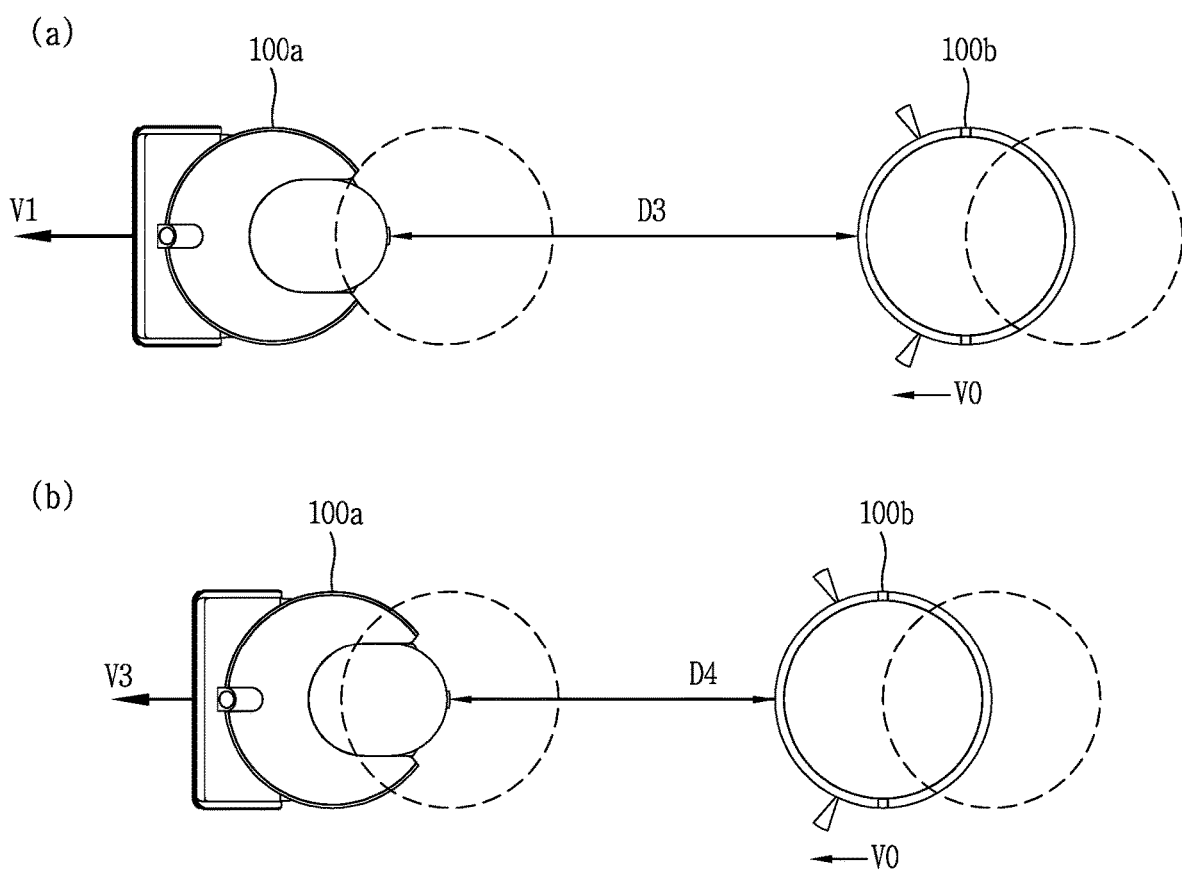

FIGS. 8A through 8C show various examples in which the first cleaner 100a controls the moving speed of itself or the second cleaner 100b based on the critical follow-up distance.

First, (a) of FIG. 8A shows a case where a separation distance (D1) between the first cleaner 100a and the second cleaner 100b does not deviate from the critical follow-up distance (e.g., minimum critical follow-up distance), but is determined to be less than the critical follow-up distance on the basis of the current moving speeds (V1, V0) of the second cleaner 100a and the second cleaner 100b.

At this time, as shown in (b) of FIG. 8A, the first cleaner 100a adds a value (plus value) obtained by subtracting the expected separation distance from the critical follow-up distance to the present moving speed (V1) to change the moving speed of the first vehicle 100a. Accordingly, the first cleaner 100a moves at the accelerated moving speed (V2), and thus the separation distance (D2) from the second cleaner 100b increases.

Next, (a) of FIG. 8B shows a case where a separation distance (D3) between the first cleaner 100a and the second cleaner 100b does not deviate from the critical follow-up distance (e.g., maximum critical follow-up distance), but is determined to be larger than the critical follow-up distance on the basis of the current moving speeds (V1, V0) of the second cleaner 100a and the second cleaner 100b.

At this time, as shown in (b) of FIG. 8B, the first cleaner 100a adds a value (minus value) obtained by subtracting the expected separation distance from the critical follow-up distance to the present moving speed (V1) to change the moving speed of the first vehicle 100a. Accordingly, the first cleaner 100a moves at the decelerated moving speed (V3), and thus the separation distance (D4) from the second cleaner 100b decreases.

Here, the decelerated moving speed (V3) may include "0". For example, when the moving speed of the second cleaner 100b is further reduced, or when the separation distance (D3) between the first cleaner 100a and the second cleaner 100b slightly deviates from the critical follow-up distance, the first cleaner 100a may be controlled to stop.

Next, (a) of FIG. 8C shows a case where it is the same as FIG. 8A that a separation distance (D5) between the first cleaner 100a and the second cleaner 100b is determined to be less than the critical follow-up distance (e.g., maximum critical follow-up distance), but the first cleaner 100a is unable to move at an accelerated speed according to the surrounding situation.

At this time, as shown in (b) of FIG. 8C, the first cleaner 100a may transmit a stop command to the second cleaner 100b while maintaining the moving speed of itself. After a predetermined period of time elapses, when separation distance (D6) between the first cleaner 100a and the second cleaner 100b increases, a drive command may be transmitted to the second cleaner 100b so as to be controlled to continue follow-up.

On the other hand, when the moving path of the second cleaner 100b is changed from the moving path of the first cleaner 100a depending on the surrounding situation, in case where the changed moving path is further away from the separation distance from the first cleaner 100a, the first cleaner 100a may receive such state information to slow down the moving speed of the first cleaner 100a or stop the moving of the first cleaner 100a for a predetermined period of time so as not to interrupt follow-up.

On the other hand, while following the plurality of robot cleaners, when the first cleaner as the leading cleaner changes its moving direction to cause a different moving direction from that of the second cleaner, the following points should be taken into consideration.

Specifically, when the first cleaner as the leading cleaner changes its move direction and gradually approaches the second cleaner as the following cleaner, a flexible collision-free avoidance design without collision is required among a plurality of robot cleaners.

Furthermore, when the first cleaner changes its moving direction and gradually approaches the second cleaner as the following cleaner, the follow-up relationship between the first cleaner and the second cleaner is reversed in the aspect of both the visual and signal receiving directions, there is a need for a design plan to continue to perform follow-up.

Accordingly, in the present disclosure, when the first cleaner as the leading cleaner changes its moving direction and gradually approaches the second cleaner as the following cleaner, a scheme capable of allowing a flexible collision-free avoidance without collision and preventing a follow-up relationship from being reversed is implemented.

First, referring to FIG. 9, limiting the follow-up of the second cleaner in accordance with a change of the moving direction of the first cleaner according to an embodiment of the present disclosure will be described in detail.

Referring to FIG. 9, the process of connecting the first cleaner 100a to the second cleaner 100b in a communicable manner based on a signal to obtain a relative position between each other is started (901). More specifically, direct communication between the first cleaner 100a and the second cleaner 100b is carried out without server communication by transmitting and receiving signals (e.g., UWB signals) to/from each other using sensors provided in the first cleaner 100a and sensors provided in the second cleaner 100b.

The first cleaner 100a may recognize a relative position of the second cleaner 100b based on a first signal transmitted and received through a sensor (e.g., a UWB sensor) provided in the first cleaner 100a and a second signal transmitted and received through a sensor (e.g., a UWB sensor) provided in the second cleaner 100b. Since the types of sensors and signals for obtaining a relative position between each other have been described above, and detailed description thereof will be omitted herein.

Based on the thus recognized relative position, the first cleaner 100a controls the second cleaner 100b to follow the moving path of the first cleaner 100a (902).

The first cleaner 100a may calculate a separation distance from the second cleaner 100b based on the time-of-flight (TOF) of signals transmitted and received to and from the second cleaner 100b. The first cleaner 100a determines that the separation distance from the second cleaner 100b is smaller as the TOF decreases, and the first cleaner 100a determines that the separation distance from the second cleaner 100b is larger as the TOF increases. In addition, a change in the separation distance may be determined using a distance of the second cleaner 100b having the first cleaner 100a at the center of a circle at two different time points.

Alternatively, in another example, the first cleaner 100a and the second cleaner 100b may determine a relative position between each other using a difference in signal receiving angles received at receiver antennas provided therein, respectively, to obtain a change in the separation distance.

The moving related information of the first cleaner 100a along with the calculated separation distance is transmitted to the second cleaner 100b. Furthermore, in one example, the second cleaner 100b may transmit its own state information to the first cleaner 100a.

Here, the moving related information may include all information on obstacle information, map information, a moving mode, a moving path, and a moving speed. Accordingly, the second cleaner 100b may sense an obstacle based on obstacle information, topographic information of the floor, and moving mode information sensed by the first cleaner 100a, and move along the moving path of the first cleaner 100a.

On the other hand, the relative position of the first cleaner 100a may be obtained by the second cleaner 100b, and thus it may be possible to generate a moving control command by itself instead of following a control command received from the first cleaner 100a and move along the movement trajectory of the first cleaner 100a. In this case, the second cleaner 100b may further include a memory for storing data related to the movement trajectory of the first cleaner 100a.

In addition, while the second cleaner 100b follows the first cleaner 100a, in order not to deviate from follow-up, an attractive force (Fm) and a repulsive force (Fo) according to the concept of virtual impedance control may be alternately applied on the basis of the determined follow-up distance.

Specifically, the first cleaner 100a may compare the calculated separation distance with a specified follow-up distance, and alternately apply attractive and repulsive forces according to the concept of virtual impedance control based on the comparison result, thereby variably controlling the moving speeds of the cleaner 100a and the second cleaner 100b. Accordingly, the second cleaner 100b may naturally follow the moving path of the first cleaner 100a seamlessly without any interruption.

For example, when the calculated separation distance is larger than the follow-up distance, the controller of the first cleaner 100a may apply an attractive force to decelerate the moving speed of the first cleaner 100a, accelerate the moving speed of the second cleaner 100b, or perform both the operations, thereby decreasing the separation distance. Furthermore, when the calculated separation distance is too small compared to the follow-up distance, the controller of the first cleaner 100a may apply a repulsive force to accelerate the moving speed of the first cleaner 100a, decelerate the moving speed of the second cleaner 100b, or perform both the operations, thereby increasing the separation distance.

Furthermore, in the present disclosure, receiving sensors may be placed on rear and front sides of the first cleaner 100a to allow the controller of the first cleaner 100a to recognize the receiving direction of a signal (e.g., a UWB signal) received from the second cleaner 100b. To this end, a UWB sensor may be provided at a rear side of the first cleaner 100a, and a UWB sensor or a plurality of optical sensors may be spaced apart from a front side of the first cleaner 100a. In addition, the second cleaner 100b may be provided with one or more UWB sensors and a plurality of receiving antennas.

The first cleaner 100a may recognize the receiving direction of a signal received from the second cleaner 100b to determine whether the second cleaner 100b is located on a rear side of the first cleaner 100a. Accordingly, the first cleaner 100a may determine whether the order of the first cleaner 100a and the second cleaner 100b is reversed.

When the moving direction of the first cleaner 100a is changed while the second cleaner 100b follows the first cleaner 100a (903), the first cleaner 100a may transmit a signal corresponding to the change of the moving direction to the second cleaner 100b (904).

Here, the change in the moving direction of the first cleaner 100a may be carried out by one or more sensing signals. The sensing signal includes one of a signal corresponding to a moving mode of the first cleaner 100a based on map information, signal reception by an external signal sensor, sensing of an obstacle by a front sensor/3D sensor/camera sensor/collision sensor, and sensing of a topographic feature of the floor by a cliff sensor/geomagnetic sensor, and a signal corresponding to sensing of entry into a region set to a virtual region (e.g., virtual wall, etc.), and sensing of entry into a trap learned by Deep Learning (DL)/Deep Neural Networks (DNN).

Furthermore, the change of the moving direction denotes that the moving direction and the moving region are changed by performing a rotational movement within a range of 5 to 360 from a current moving direction. For example, the change of the moving direction may be a case where the first cleaner 100a faces a wall and rotates 360 degrees in a reverse direction to move the next moving region (next moving line). Furthermore, for example, the change of the moving direction may be a case where the first cleaner 100a senses a cliff through the cliff sensor and makes a left turn by 90 degrees from the current moving direction. Furthermore, the change of the moving direction may be a case where the first cleaner 100a recognizes that the next moving region is a learned trap and moves along the boundary of the trap region.

In addition, the change of the moving direction may be carried out in response to the sensing of an obstacle.

Here, the obstacle may include a cliff as well as a fixed obstacle such as a wall, a furniture, a fixture, or the like, protruded from the floor of the cleaning area to obstruct moving of the cleaner, and a moving obstacle.

In addition, the change of the moving direction may include turning. For example, when the cleaning area is cleaned in a zigzag manner, if an obstacle such as a wall, a sill, and a door is sensed after cleaning a single line, then the first cleaner 100a may perform turning to clean the next line according to the moving mode.

Here, in a broad sense, turning simply denotes that the cleaner rotates the wheel unit 100 in a left and right direction from the current moving direction to change the moving direction. In a narrow sense, turning may denote a continuous operation in which the cleaner rotates the wheel unit 100 in a left and right direction to perform in-place rotation and then changes the moving direction in a reverse direction. Hereinafter, it will be described on the assumption of turning in a narrow sense, but also includes the above-described turning operation in a broad sense as long as it is not contradictory or inconsistent.

When the moving direction of the first cleaner 100a is changed, the first cleaner 100a may inform it to the second cleaner 100b, thereby allowing the second cleaner 100b to move in a corresponding manner by changing the moving direction after a predetermined period of time.

Next, the first cleaner 100a transmits a follow-up restriction command corresponding to a change in the receiving direction of the signal received from the second cleaner 100b to the second cleaner 100b according to a change of the moving direction (905).

As described above, in the present disclosure, receiving sensors may be placed on rear and front/left and right sides of the first cleaner 100a to allow the controller of the first cleaner 100a to recognize the receiving direction of a signal received from the second cleaner 100b by distinguishing the front and rear sides.

To this end, a UWB sensor may be provided at a rear side of the first cleaner 100a, and a UWB sensor or a plurality of optical sensors may be spaced apart from a front side of the first cleaner 100a. The first cleaner 100a may recognize the receiving direction of an optical signal received from the second cleaner 100b to determine whether the second cleaner 100b is coming from the rear side of the first cleaner 100a or located at the front side thereof in a reversed manner.

Alternatively, receiving sensors may be provided on the front and rear sides or on the left and right sides of the second cleaner 100b to allow the controller of the second cleaner 100b to recognize the receiving direction of signals received from the first cleaner 100a by distinguishing the front and rear sides.

Here, the control command for restricting follow-up includes a moving stop command for the second cleaner 100b and a follow-up release command for the main body. At this time, however, a connection state of the first cleaner 100a and the second cleaner 100b is maintained, and a relative position between each other is obtained to maintain a critical follow-up distance. In other words, a separation distance between the first cleaner 100a and the second cleaner 100b does not deviate from a predetermined critical follow-up distance.

Information related to a moving path that has moved by the first cleaner 100a while the follow-up of the second cleaner 100b is restricted may be transmitted to the second cleaner 100b after the follow-up restriction is released. Alternatively, even while the follow-up of the second cleaner 100b is restricted, the second cleaner 100b may store the information related to the moving path of the first cleaner 100a in the memory or the like, and release the follow-up restriction, and then operate to first clear the previous moving path and then resume follow-up.

A control command for restricting follow-up may continue until a specified condition is satisfied after a change in the receiving direction of the signal received from the second cleaner 100b is sensed subsequent to changing the moving direction, for example, subsequent to performing turning by the second cleaner 100b.

Here, the specified condition may be a lapse of a predetermined period of time subsequent to the turning of the first cleaner 100a, a change in the separation distance between the first cleaner 100a and the second cleaner 100b (e.g., a time point at which the separation distance decreases and then increases again, or the separation distance increases to the maximum critical follow-up distance), and a re-change in the receiving direction of the signal transmitted from the second cleaner 100b.

In one example, a time point when the follow-up is resumed may coincide with a time point when the specified condition is satisfied. For example, it may be a time point at which a predetermined period of time has passed subsequent to performing turning by the first cleaner 100a. Alternatively, it may be a time point at which the separation distance between the first cleaner 1a and the second cleaners 100b decreases and then increases again subsequent to performing turning by the first cleaner 100a. Alternatively, it may be a time point at which the receiving direction of the signal transmitted from the second cleaner 100b is changed for the second time, that is, when a signal of the second cleaner 100b is received again from a rear side of the first cleaner 100a subsequent to performing turning by the first cleaner 100a.

Here, a change in the receiving direction of the signal transmitted from the second cleaner 100b may be determined based on where a signal (e.g., a UWB signal) received from the second cleaner 100b is strongly recognized among a plurality of optical sensors (e.g., IR sensors, ultrasonic sensors, etc.) arranged on an outer circumferential surface of the first cleaner 100a or among a plurality of antennas provided in the first cleaner 100a.

For example, when the second cleaner 100b changes its moving direction while the first cleaner 100a maintains a current moving direction, the receiving direction of a signal transmitted from the second cleaner 100b may be changed. Alternatively, the receiving direction of a signal transmitted from the second cleaner 100b may be changed as the first cleaner 100a changes its moving direction subsequent to the turning operation of the first cleaner 100a while the second cleaner 100b maintains a current moving direction or is in a stopped state. In the latter case, when the first cleaner 100a passes the second cleaner 100b, the receiving direction of the signal is changed again.

On the other hand, in another example, as the first cleaner 100a changes its moving direction subsequent to the turning operation, a change in the receiving direction of a signal transmitted from the first cleaner 100a to the second cleaner 100b may be sensed by the second cleaner 100b.

Furthermore, when the moving directions of the first and second cleaners 100a, 100b coincide with each other as the second cleaner 100b changes its moving direction subsequent to the turning operation, a re-change in the receiving direction of a signal transmitted from the second cleaner 100b may be sensed by the first cleaner 100a. In this case, the first cleaner 100a continues to move at its original moving speed, and the second cleaner 100b performs follow-up moving along the moving path of the first cleaner 100a.

Hereinafter, various examples related to restricting the follow-up of the second cleaner 100b to prevent the first cleaner 100a from colliding with the second cleaner 100b as well as reversal of front and rear positions when the first cleaner 100a moves by changing its move direction subsequent to the turning operation will be described in detail with referring to the drawings.

First, referring to FIGS. 10A, 10B, 10C, 10D, and 10E, the first cleaner will change its moving direction subsequent to turning, and then the second cleaner will run away from the first cleaner.

Figure 10A:
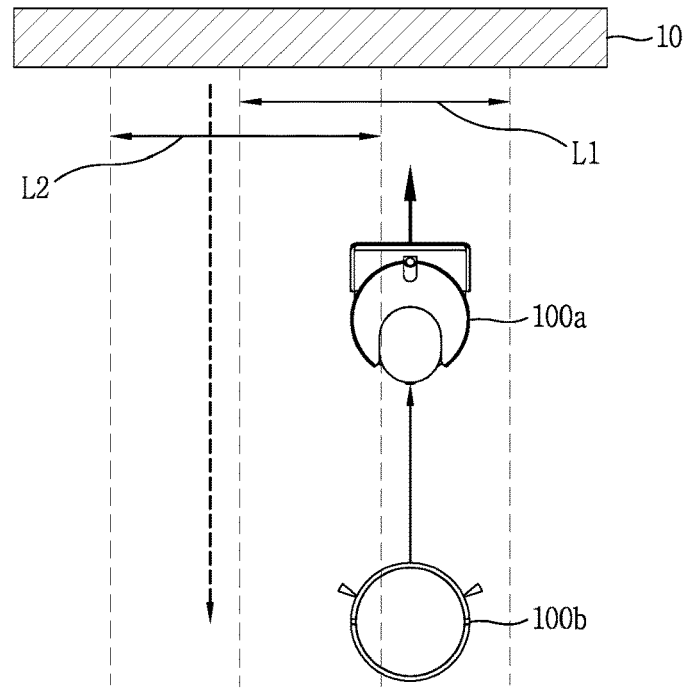
FIGS. 10A, 10B, 10C, 10D and 10E are conceptual views for explaining an operation in which the second cleaner moves while avoiding the first cleaner subsequent to the turning of the first cleaner according to an embodiment of the present disclosure.

First, as illustrated in FIG. 10A, the first cleaner 100a performs zigzag pattern cleaning in the lead, and the second cleaner 100b performs cleaning while following along the moving path of the first cleaner 100a.

When the first cleaner 100a completes the cleaning of a first line (L1), and performs turning, or in-place rotation (LR), while following a wall 10 to move to a second line (L2) when the wall 10 is encountered in accordance with a zigzag pattern. At this time, it may be controlled to maintain a predetermined distance between the wall 10 and the first cleaner 100*a*, thereby facilitating in-place rotation (LR). The in-place rotation (LR) may be carried out by driving the main wheel 111*a* and the sub wheel 111*b* at different speeds or driving them in different directions.

While the first cleaner 100*a* performs turning as described above, as illustrated in FIG. 10, the second cleaner 100*b* moves straight ahead while following along a moving path of the first cleaner 100*a* up to a specified follow-up distance (Dmin) and then stops.

To this end, the first cleaner 100*a* senses that the second cleaner 100*b* has entered the specified follow-up distance (Dmin), and transmits a stop command to the second cleaner 100*b* at that time point. Alternatively, the first cleaner 100*a* may transmit a stop command once, and the second cleaner 100*b* may execute the stop command at a time point when the cleaner 100*b* enters the specified follow-up distance (Dmin). Such a stop command belongs to a control command that restricts follow-up. Alternatively, the second cleaner 100*b* may also recognize a relative position of the first cleaner 100*a*, and therefore, when the second cleaner 100*b* is closer to the first cleaner 100*a* within the specified follow-up distance (Dmin), the second cleaner 100*b* itself may output a control command that restricts follow-up.

Figure 10B:
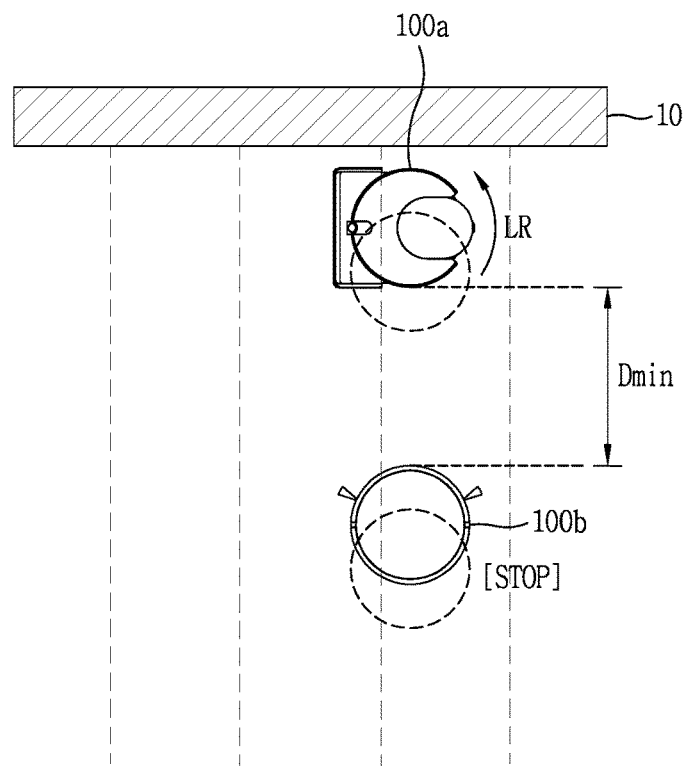
Figure 10C:
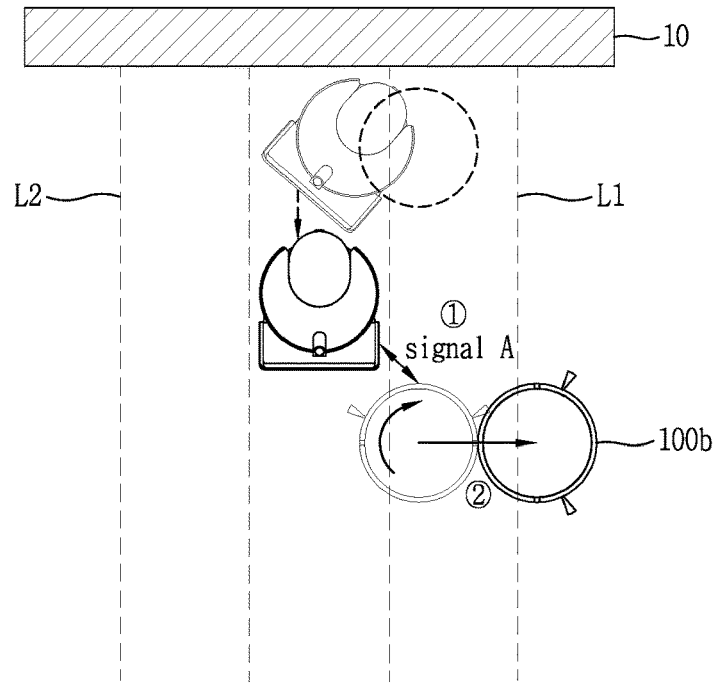

Next, referring to FIG. 10C, the first cleaner 100*a* that has performed in-place rotation while following the wall 10 enters the second line (L2). At this time, the moving direction in the second line (L2) is a reverse direction of the moving direction in the first line (L1).

When the second cleaner 100*b* is not present on the second line (L2), the first cleaner 100*a* may perform straight moving.

On the other hand, since the first line (L1) is partially overlapped with the second line (L2), when the first cleaner 100*a* continues to move along the second line (L2), the first cleaner 100*a* collides with the second cleaner 100*b*. The first cleaner 100*a* may move while avoiding the second cleaner 100*b* through the obstacle sensor or the like, but in this case, an error may occur in the cleaning path plan of the first cleaner 100*a*. Such an error may increase as the number of times the first cleaner 100*a* avoids the second cleaner 100*b* increases.

When the first cleaner 100*a* senses that the first cleaner 100*a* approaches the second cleaner 100*b* within a reference range (e.g., within 10 cm) as the first cleaner 100*a* changes its moving direction, the second cleaner 100*b* may move by avoiding the first cleaner 100*a*.

To this end, referring to FIG. 10C, the first cleaner 100*a* senses the signal intensity and signal direction of a signal A emitted from the second cleaner 100*b* through a sensor (e.g., a UWB or an optical sensor) provided in the first cleaner 100*a*, thereby sensing that it is close to the position of the second cleaner 100*b*. Furthermore, the signal intensity and signal direction of the signal A emitted from the first cleaner 100*a* (①), thereby sensing that the first cleaner 100*a* approaches. Accordingly, the second cleaner 100*b* in a stationary state moves in a direction away from the first cleaner 100*a* and the second line (L2) (②). In FIG. 10C, it is illustrated that the second cleaner 100*b* moves to the right, but the present disclosure is not limited thereto, and for example, the second cleaner 100*b* may move upward or backward by 45 degrees.

Here, the moving direction of the second cleaner 100*b* is a direction away from the expected position of the first cleaner 100*a*, and the moving distance may be within the radius or diameter of the first cleaner 100*a*.

In one example, it may be implemented in FIG. 10B to move the second cleaner 100*b* in advance at a time point when the first cleaner 100*a* senses another wall 10*b* as an obstacle and transmits it to the second cleaner 100*b*. In this case, since the second cleaner 100*b* has moved in advance by avoiding the first cleaner 100*a*, the first cleaner 100*a* does not need to decelerate the second line (L2).

On the other hand, although not shown, in another example, the controller of the first cleaner 100*a* may sense the second cleaner 100*b* existing within the next moving region of the main body, that is, the second line (L2), subsequent to turning, and control the traveling unit 1300 to move along an outer edge of the second cleaner 100*b* while moving out of the second line (L2) as a current moving region when in proximity to the second cleaner 100*b*. In other words, the first cleaner 100*a* may be implemented to move while avoiding the second cleaner 100*b*. In this case, it is not necessary to move the second cleaner 100*b* in a stationary state.

At this time, the first cleaner 100*a* may move while drawing an arc along an outer edge of the second cleaner 100*b*. Here, the length of the arc may be proportional to a time point at which the second cleaner 100*b* is separated from the second cleaner 100*b* after proximity to the second cleaner 100*b* is sensed. In addition, the arc may be drawn as close as possible to the outer edge of the second cleaner 100*b*. This is because an area excluded from the cleaning area increases as the first cleaner 100*a* moves to draw an arc while being far away from the outer edge of the second cleaner 100*b*. While the first cleaner 100*a* is moving while avoiding the second cleaner 100*b* as described above, the second cleaner 100*b* may continuously maintain the stationary state or perform the cleaning operation in place according to the follow-up restriction.

In one example, while the first cleaner 100*a* transmits a control command for restricting follow-up to the second cleaner 100*b* as described above while a signal received from the second cleaner 100*b* is received from the front side with respect to the current moving direction of the first cleaner 100*a*. In other words, while the signal received from the second cleaner 100*b* is received from the front side with respect to the current moving direction of the first cleaner 100*a*, the second cleaner 100*b* maintains the stationary state or maintain the stationary state at the moved time point.

Figure 10D:
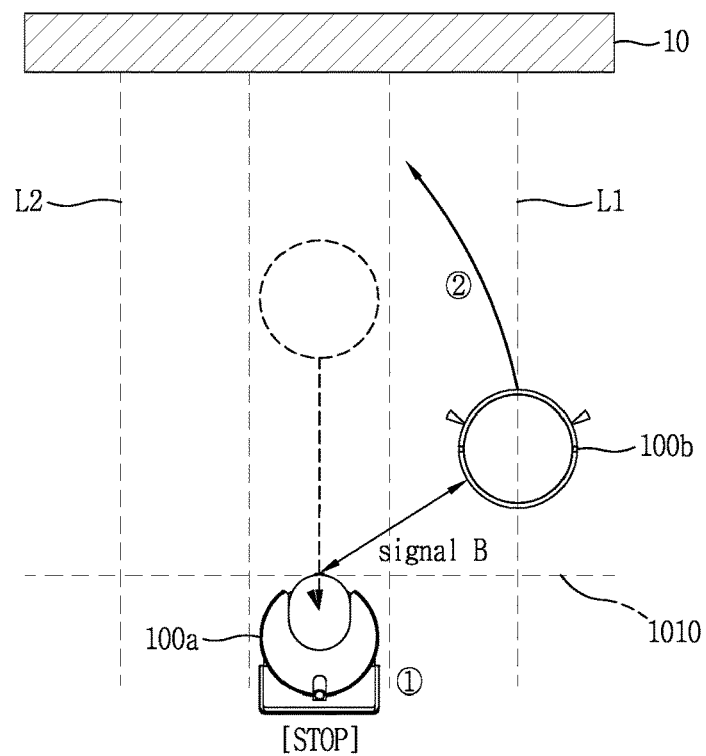

Next, as illustrated in FIG. 10D, as the first cleaner 100*a* continuously moves in the current moving direction, that is, the second line (L2), at a time point when a signal received from the second cleaner 100*b* is sensed from the rear side with respect to the current moving direction of the first cleaner 100*a* (①), the second cleaner 100*b* starts moving of the first line (L1) (②) to follow the moving path of the first cleaner 100*a*.

In other words, as illustrated in FIG. 10D, the follow-up resume time point of the second cleaner 100*b* may coincide to a time point at which that a signal B transmitted from the second cleaner 100*b* is received from the rear side with respect to the moving direction of the first cleaner 100*a* or the receiving direction of the signal B transmitted from the first cleaner 100*a* is reversed.

In other words, subsequent to turning, the second cleaner 100*b* is positioned in front of the first cleaner 100*a* in the lead. Therefore, when follow-up is performed in this state, interference may occur. Accordingly, control for temporarily releasing follow-up when the second cleaner 100*b* as the following cleaner is positioned in front of the first cleaner 100*a*, and connecting follow-up when the second cleaner is positioned behind the first cleaner 100*a* is required by distinguishing forward and backward directions in which a signal is received.

For this purpose, in addition to a sensor (e.g., UWB) for obtaining a relative position, a receiving optical sensor or antenna for IR, ultrasonic waves, and the like may be disposed in front of and behind the first cleaner 100*a*, and a transmitting optical sensor may also be additionally disposed or a plurality of antennas may be arranged in the second cleaner 100*b* to determine whether the second cleaner 100*b* is on the front side or on the rear side with respect to the current moving direction of the first cleaner 100*a*.

In other words, the second cleaner 100*b* is located in front of the first cleaner 100*a* in FIG. 10C, and thus the follow-up restriction between the first cleaner 100*a* and the second cleaner 100*b* is maintained. Accordingly, the second cleaner 100*b* performs a stationary state or in-place cleaning. In FIG. 10D, the follow-up of the second cleaner 100*b* to the first cleaner 100*a* is resumed at a time point 1010 when it is determined that the second cleaner 100*b* is located behind the first cleaner 100*a*.

The reason why the first cleaner 100*a* maintains follow-up restriction until it is positioned in front of the second cleaner 100*b* is to solve an error of follow-up control and control complexity due to reversal of front and rear positions.

In FIG. 10D, the first cleaner 100*a* stops (①) after transmitting a follow-up resume command to the second cleaner 100*b*. When the first cleaner 100*a* continues to move while the second cleaner 100*b* moves toward the wall 10 to perform turning, a separation distance between the plurality of cleaners further increases. This is because in this manner, when the separation distance between the first cleaner 100*a* and the second cleaner 100*b* increases so much, the visual stability of the follow-up relationship is hindered.

The first cleaner 100*a* may sense the turning and the change of the moving direction of the second cleaner 100*b* even while the first cleaner 100*a* stops through the above-described sensing of the change in the receiving direction of the signal. Now, according to the follow-up moving of the second cleaner 100*b*, a separation distance between the plurality of cleaners decreases. Accordingly, in one example, when a re-change in the receiving direction of the signal transmitted from the second cleaner 100*b* is sensed, the first cleaner 100*a* may operate to resume moving.

As described above, the second cleaner 100*b* moves straight ahead (②) and then performs in-place rotation while following the wall 10, and enters the second line (L2) to follow a moving path through which the first cleaner 100*a* has passed. During this time, the first cleaner 100*a* remains in a stationary state.

When a separation distance between the first cleaner 100*a* and the second cleaner 100*b* decreases within the specified follow-up distance according to the moving of the second cleaner 100*b*, the first cleaner 100*a* resumes moving again, and the second cleaner 100*b* follows along the moving path of the first cleaner 100*a*.

Figure 10E:
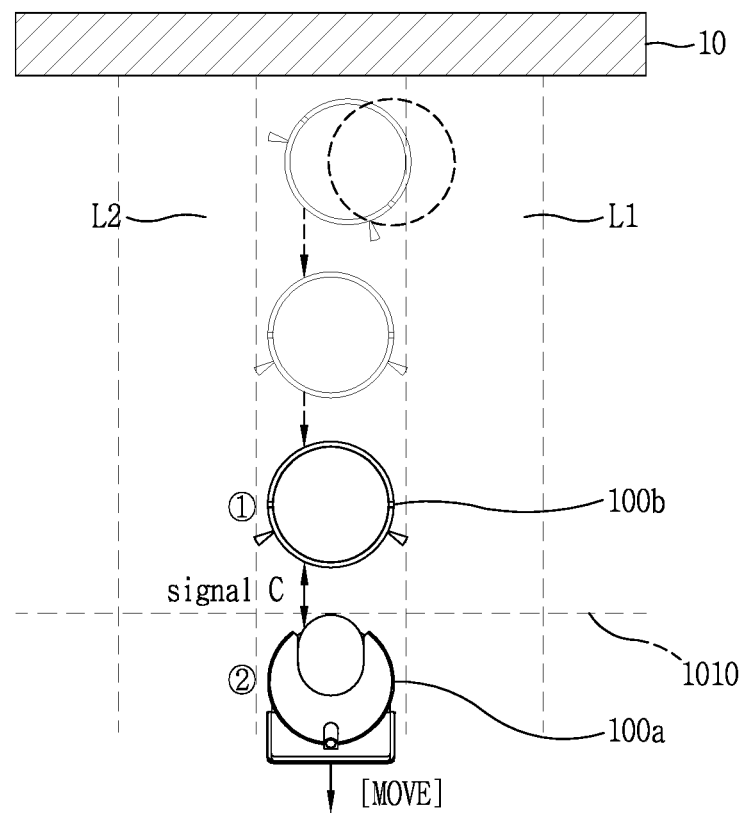

At this time, as illustrated in FIG. 10E, the second cleaner 100*b* moves straight ahead along the second line (L2), and the first cleaner 100*a* starts moving again when it is sensed that a separation distance between the two cleaners decreases within the specified follow-up distance based on a signal C transmitted from the first cleaner 100*a* or a signal C transmitted from the second cleaner 100*b*. The second cleaner 100*b* follows along the moving path of the first cleaner 100*a* as previously.

However, since the second cleaner 100*b* is currently moving out of the first line (L1), it may enter the first line (L1) while drawing an arc, and then follow the previous moving path of the first cleaner 100*a* (②). At this time, the arc is drawn while following the first line (L1). Specifically, the arc is drawn so as to enter the first line (L1) through the shortest distance, but the arc is drawn with a corrected value in consideration of the state of the wheel unit 111 and the moving speed of the second cleaner 100*b*.

On the other hand, if the first cleaner 100*a* moves while avoiding the second cleaner 100*b*, then the moving path through which the first cleaner 100*a* has passed draws an arc. Then, when the second cleaner 100*b* moves along the moving path through which the first cleaner 100*a* has passed, if there are no other obstacles within the moving area of the second line (L2), then the second cleaner 100*b* may perform straight moving unlike the moving path of the vehicle 100*a*.

In other words, while the second cleaner 100*b* follows along the moving path of the first cleaner 100*a* subsequent to changing the moving direction of the first cleaner 100*a*, the first cleaner 100*a* may ignore the moving path deviated from the moving region of the first cleaner itself and move straight ahead in order to avoid the second cleaner 100*b*.

The first cleaner 100*a* may maintain a moving stop state until the second cleaner 100*b* enters the second line (L2) or until a separation distance between the first cleaner 100*a* and the second cleaner 100*a* decreases within the minimum critical follow-up distance after the second cleaner 100*b* enters the second line (L2). This is to allow the first cleaner 100*a* to wait for at least while the second cleaner 100*b* follows the wall 10 so that follow-up is not interrupted.

In FIG. 10E, when the first cleaner 100*a* and the second cleaner 100*b* are sufficiently close to each other based on the signal C, the first cleaner 100*a* performs moving again and the second cleaner 100*b* follows along the moving path of the first cleaner 100*a*.

Next, FIGS. 11A, 11B, 11C, 11D and 11E illustrate an embodiment in which the first cleaner changes its moving direction subsequent to turning, and the first cleaner moves while avoiding the second cleaner in a situation where the second cleaner is unable to avoid the first cleaner.

Figure 11A:
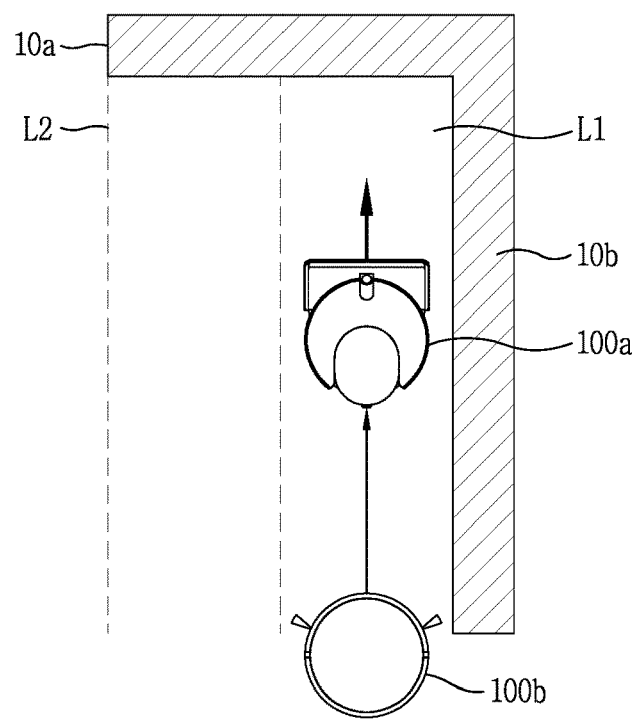
FIGS. 11A, 11B, 11C, 11D and 11E are conceptual views for explaining an example in which the first cleaner moves while avoiding the second cleaner in a situation that the second cleaner is unable to avoid subsequent to the turning of the first cleaner according to an embodiment of the present disclosure.

As illustrated in FIG. 11A, a situation in which a lateral side of the first line (L1) on which the first cleaner 100*a* moves is blocked by another wall 10*b* and the second cleaner 100*b* is unable to avoid the first cleaner 100*a* later is illustrated herein.

Figure 11B:
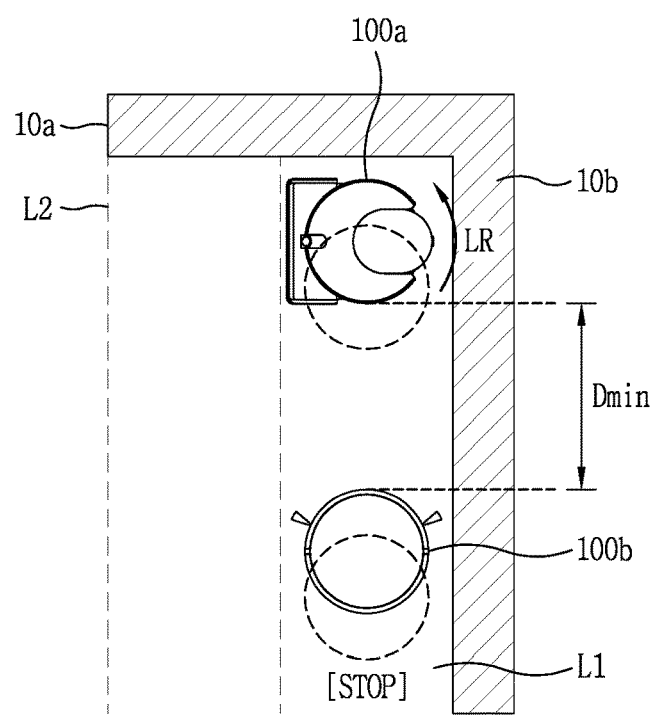

Referring to FIG. 11B, the first cleaner 100*a* may sense the wall 10*b* located on the left side of the moving direction as an obstacle while moving along the first line (L1). Such obstacle information may also be sensed by the second cleaner 100*b*.

When the first cleaner 100*a* completes the cleaning of a first line (L1), and performs turning, or in-place rotation (LR), while following a wall 10 to move to a second line (L2) when the wall 10 is encountered in accordance with a zigzag pattern. At this time, it may be controlled to maintain a predetermined distance between the wall 10 and the first cleaner 100*a*, thereby facilitating in-place rotation (LR). The in-place rotation (LR) may be carried out by driving the main wheel 111*a* and the sub wheel 111*b* at different speeds or driving them in different directions.

While the first cleaner 100*a* performs turning as described above, as illustrated in FIG. 11B, the second cleaner 100*b* moves straight ahead while following along a moving path of the first cleaner 100*a* up to a specified follow-up distance (Dmin) and then stops.

To this end, the first cleaner 100a senses that the second cleaner 100b has entered the specified follow-up distance (Dmin), and transmits a stop command to the second cleaner 100b at that time point. Alternatively, the first cleaner 100a may transmit a stop command once, and the second cleaner 100b may execute the stop command at a time point when the cleaner 100b enters the specified follow-up distance (Dmin). Such a stop command belongs to a control command that restricts follow-up. Alternatively, the second cleaner 100b may also recognize a relative position of the first cleaner 100a, and therefore, when the second cleaner 100b is closer to the first cleaner 100a within the specified follow-up distance (Dmin), the second cleaner 100b itself may output a control command that restricts follow-up.

Figure 11C:
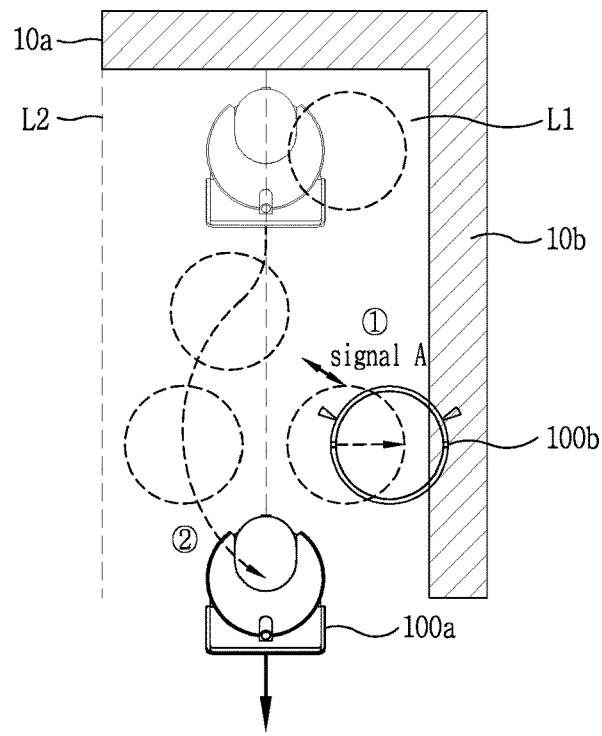
Figure 11D:
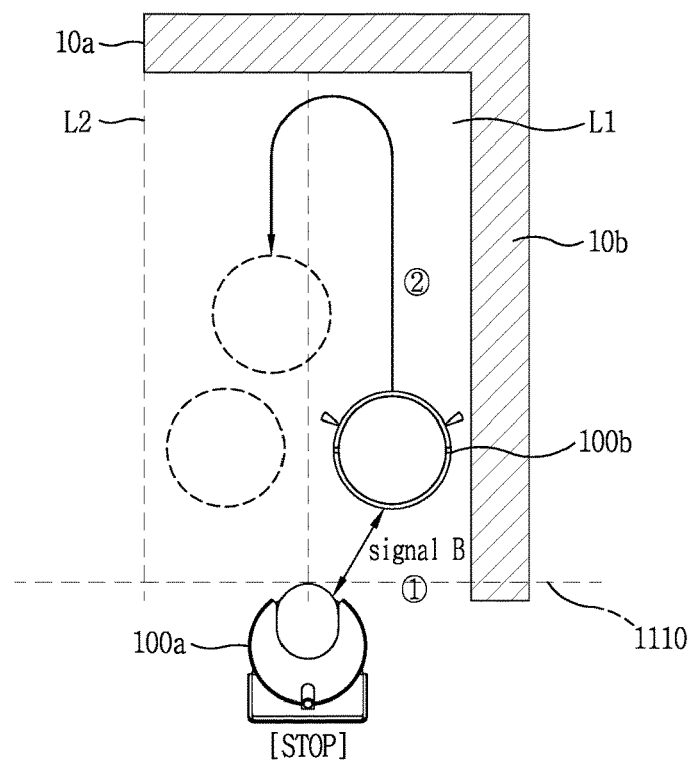

Next, as illustrated in FIG. 11C, if it is determined a situation in which the second cleaner 100b is unable to move to the right when the first cleaner 100a is in proximity to the second cleaner 100b, based on the signal A, that it, if it is determined not to move out of the second line (L2), the controller of the first cleaner 100a may control the traveling unit 1300 to move out of the second line (L2), which is a current moving region, and move along an outer edge of the second cleaner 100b when in proximity to the second cleaner 100b. In other words, the first cleaner 100a may be implemented to move while avoiding the second cleaner 100b. This is because the second cleaner 100b is unable to move away from the first cleaner 100a due to the presence of the wall 10b.

The first cleaner 100a may move while drawing an arc along an outer edge of the second cleaner 100b. Here, the length of the arc may be proportional to a time point at which the second cleaner 100b is separated from the second cleaner 100b after proximity to the second cleaner 100b is sensed. In addition, the arc may be drawn as close as possible to the outer edge of the second cleaner 100b. This is because an area excluded from the cleaning area increases as the first cleaner 100a moves to draw an arc while being far away from the outer edge of the second cleaner 100b. While the first cleaner 100a is moving while avoiding the second cleaner 100b as described above, the second cleaner 100b may continuously maintain the stationary state or perform the cleaning operation in place according to the follow-up restriction.

As described above, as illustrated in FIG. 11D, the first cleaner 100a moves while drawing an arc and enters the second line (L2) again to move along the second line (L2) until it is positioned in front of the second cleaner 100b. Furthermore, when it is sensed that the second cleaner 100b is located behind the first cleaner 100a based on the signal B, the first cleaner 100a stops moving (①). Then, the follow-up of the second cleaner 100b is resumed, and the second cleaner 100b follows along the previous move path of the first cleaner 100a from the current position (②).

Figure 11E:
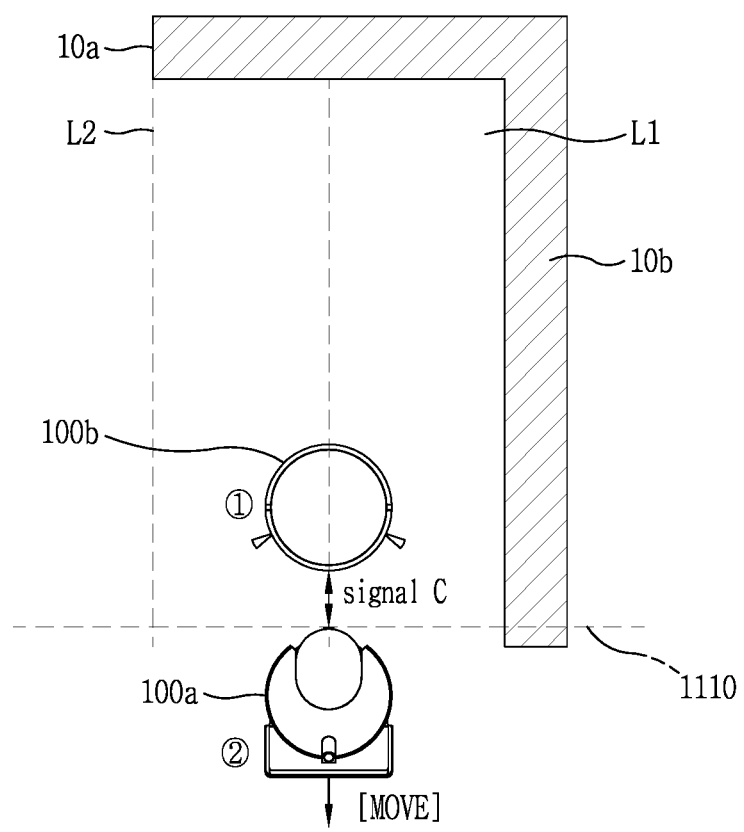

Next, as illustrated in FIG. 11E, if the first cleaner 100a and the second cleaner 100b are sufficiently close to each other (①) based on the signal C, the first cleaner 100a performs moving (②) again, and the second cleaner 100b follows along the moving path of the first cleaner 100a.

For another example, FIGS. 12A, 12B, 12C and 12D show an example of control of the second cleaner in a situation where both the first cleaner and the second cleaner are unable to avoid each other subsequent to the turning of the first cleaner.

Figure 12A:
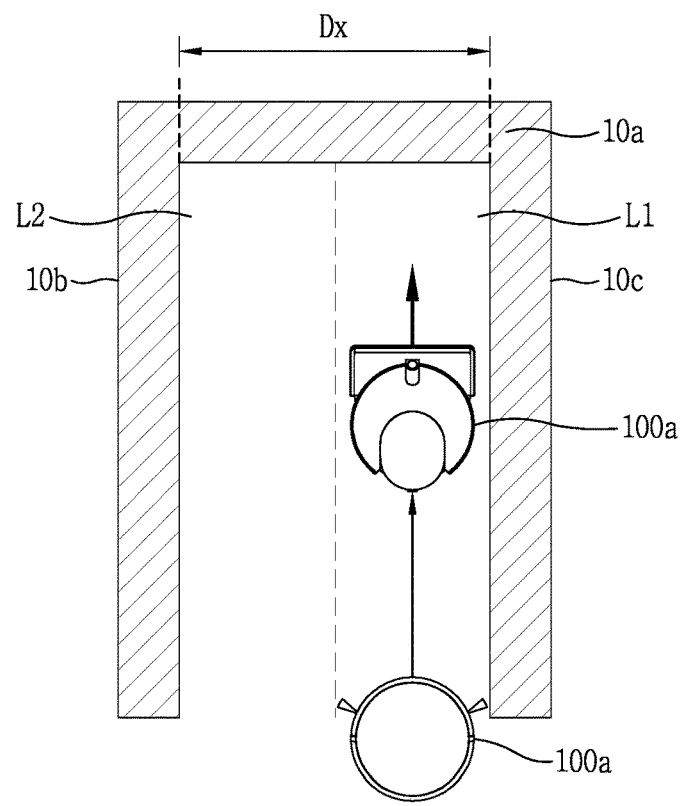

As illustrated in FIG. 12A, a situation in which both the first cleaner 100a and the second cleaner 100b are unable to avoid each other as a case where a lateral side of the second line (L2) into which the first cleaner 100a should enter is blocked by another wall 10b, and a lateral side of the second cleaner 100b is also blocked by an obstacle such as still another wall 10c or the like is illustrated herein.

Figure 12B:
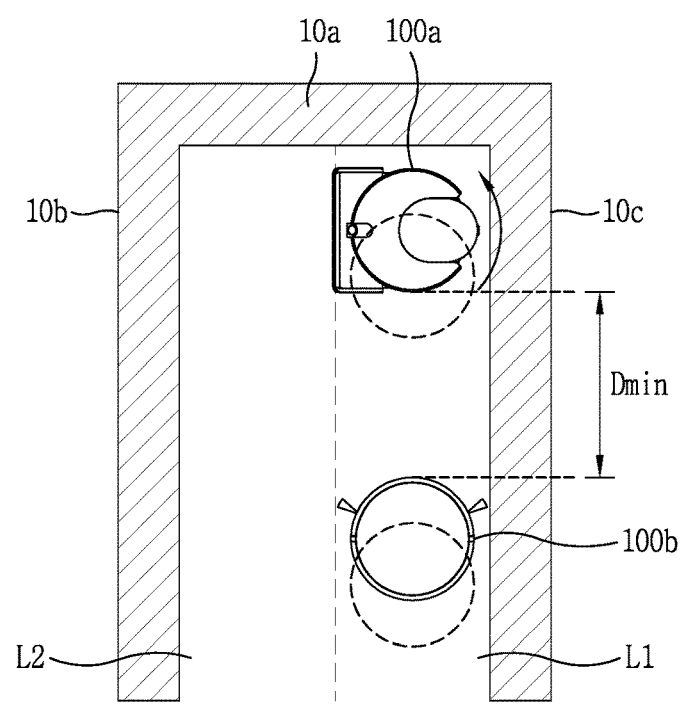

Referring to FIG. 12B, the first cleaner 100a performs in-place rotation in consideration of both the first wall 10a and the second wall 10c, and at this time point, the follow-up of the second cleaner 100b is temporarily released. The third wall 10b positioned at the front side may be sensed as an obstacle at a time point when the first cleaner 100a rotates 90 degrees. Such obstacle information may be transmitted to the second cleaner 100b located within the follow-up distance.

Figure 12C:
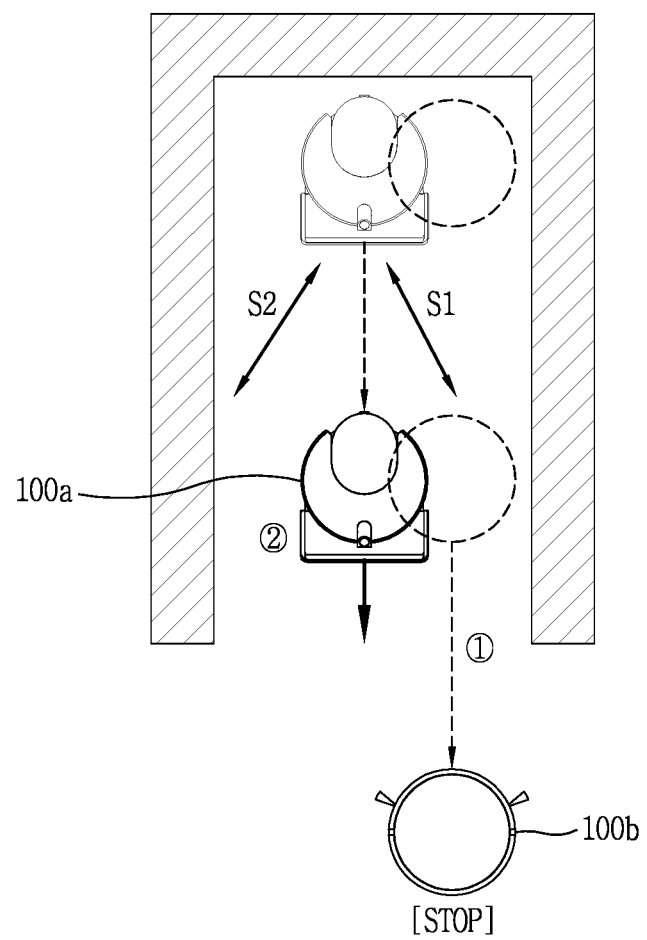

Next, referring to FIG. 12C, when the first cleaner 100a performs turning while following the first and second walls and then enters a new line, the first cleaner 100a recognizes a plurality of obstacles existing in front of the moving direction, that are, the third wall 10c and the second cleaner 100b.

In one example, the control of the first cleaner 100a to the second cleaner 100a may be carried out differently depending on whether a single obstacle is sensed or a plurality of obstacles are sensed subsequent to turning.

When a plurality of obstacles are sensed in front of the first cleaner 100a that has entered the new line, it is controlled that the second cleaner 100b perform reverse moving until only a single obstacle, i.e., the third wall 10c is sensed (①). Here, reverse moving denotes performing the moving path through which the second cleaner 100b has passed in a reverse direction. At this time, the separation distance between the second cleaner 100b and the first cleaner 100a may deviate from the specified follow-up distance. In other words, the moving distance in a reverse direction may deviate from the follow-up distance. This is because the second cleaner 100b is not moving out of the moving path of the first cleaner 100a.

The first cleaner 100a performs straight moving on the newly entered line while at the same time performing the reverse moving of the second cleaner 100b or subsequent to performing reverse moving (②). The inverse moving of the second cleaner 100b may be continued until the third wall 10c is not sensed by the first cleaner 100a or may be repeated each time a plurality of obstacles are sensed by the first cleaner 100a. In other words, in the latter case, the second cleaner 100b may repeatedly execute inverse moving and stop.

Figure 12D:
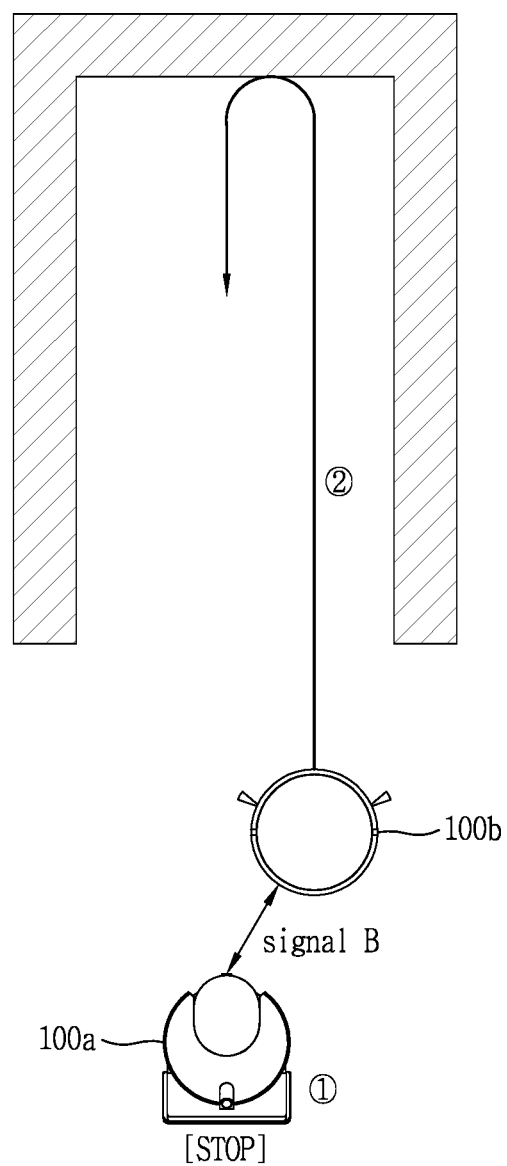

Next, as illustrated in FIG. 12D, the first cleaner 100a moves until the second cleaner 100b is positioned behind the first cleaner 100a, and then the follow-up of the second cleaner 100b is resumed. Specifically, the first cleaner 100a stops (①), and then the second cleaner 100b performs normal moving again to clean while following the move path of the first cleaner 100a (②).

Next, a method of allowing the first cleaner and the second cleaner to perform moving while at the same time avoiding each other as another follow-up restriction command will be described with reference to FIG. 13.

Figure 13:
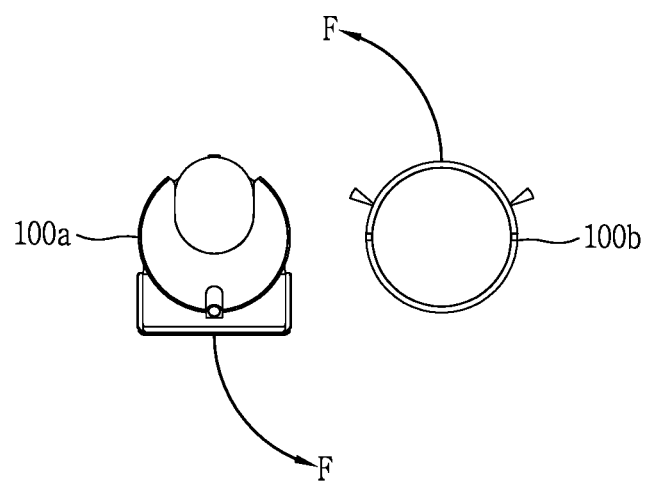
FIG. 13 is a view for explaining an operation in which the first cleaner and the second cleaner move without any interruption while avoiding each other at the same time according to an embodiment of the present disclosure.

FIG. 13 is a view for explaining a method in which the leading robot and the following robot simultaneously avoid each other more naturally. First, the first cleaner 100a as the leading cleaner senses the presence of the second cleaner 100b as the following cleaner. The sensing information is transmitted to the second cleaner 100b. Next, at a time point when the first cleaner 100a moves while drawing an arc along an outer circumferential surface about the second cleaner 100b, a control command is transmitted to allow the second cleaner 100b to also move while drawing an arc in the same direction about the first cleaner 100a. Accordingly, the first cleaner 100a and the second cleaner 100b move in different moving directions while drawing virtual circles.

At this time, it may be said that a repulsive force (i.e., pushing force) of a virtual impedance is applied to an inner circle formed between the first cleaner 100a and the second cleaner 100b, and an attractive force (i.e., pulling force) of the virtual impedance is applied to an outer circle formed at an outside of the first cleaner 100a and the second cleaner 100b.

In case where an allowable range of the specified follow-up distance between the first cleaner 100a and the second cleaner 100b is sufficiently large, when it is implemented that the first cleaner 100a and the second cleaner 100b move while avoiding each other, then the first cleaner 100a and the second cleaner 100b may not need to stop, thereby completing cleaning in a more efficient and quick manner.

On the other hand, a case where any one of the two cleaners follows the other has been described as an example, but the present disclosure is not limited thereto, and embodiments of the present disclosure may be applicable to a case where three or more cleaners perform cleaning while maintaining a follow-up relationship. In this case, it may be designed with a relationship in which one of the three cleaners is a leading cleaner and the other two follows the leading cleaner, or either one of the other two follows another one.

Figure 14A:
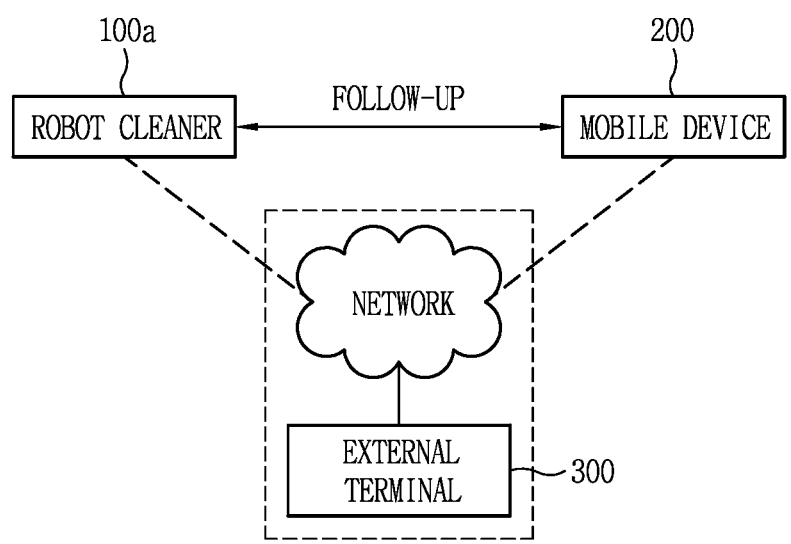
FIGS. 14A, 14B and 14C are conceptual views for explaining follow-up registration and follow-up control between a mobile robot and other mobile devices, according to a modified embodiment of the present disclosure.
Figure 14B:
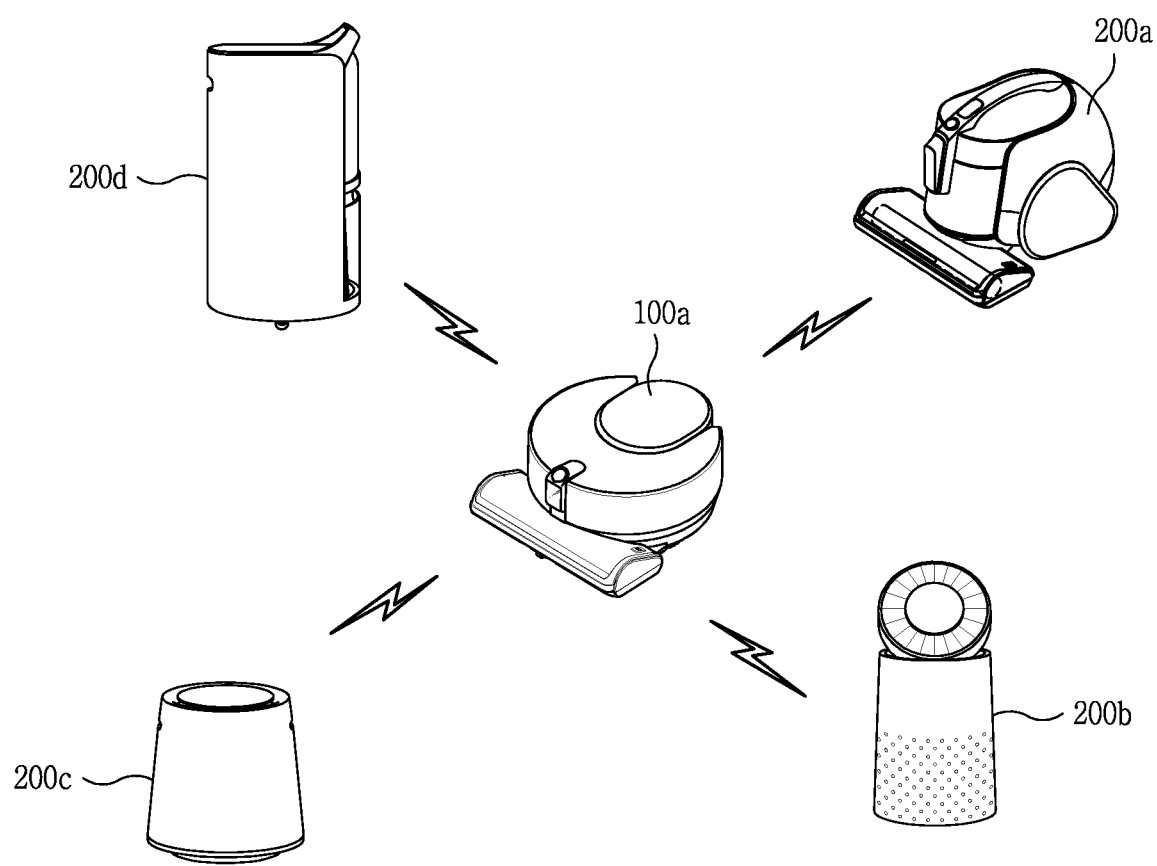
Figure 14C:
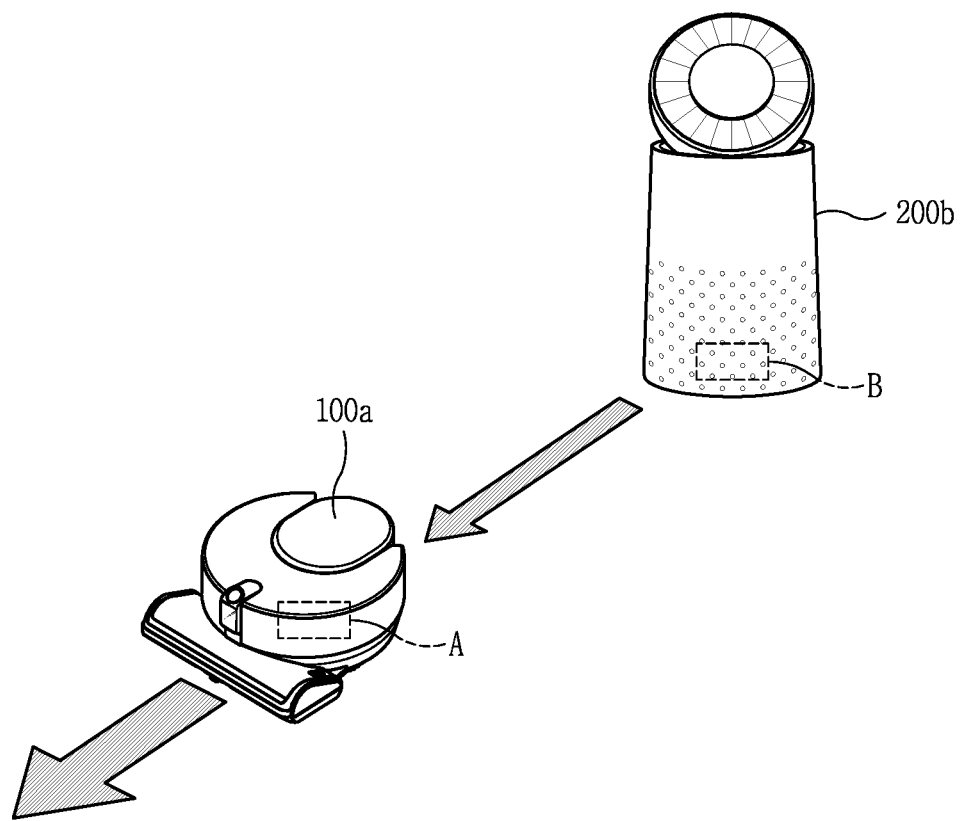

FIGS. 14A, 14B, and 14C are modified examples of follow-up control between the first cleaner and the second cleaner in accordance with the foregoing embodiments of the present disclosure, and here, follow-up control between the first cleaner and a mobile device will be described in detail. Here, the follow-up control disclosed herein means only that the mobile device follows a movement path of the first cleaner.

Referring to FIG. 14A, the first cleaner 100a may control the follow-up of a mobile device 200 by communicating with the mobile device 200 instead of the second cleaner.

Here, the mobile device 200 may not have a cleaning function, and may be any electronic device if it is provided with a driving function. For example, the mobile device 200 may include various types of home appliances or other electronic devices, such as a dehumidifier, a humidifier, an air purifier, an air conditioner, a smart TV, an artificial intelligent speaker, a digital photographing device, and the like, with no limit.

In addition, the mobile device 200 may be any device if it is equipped with a moving function, and may not have a navigation function for detecting an obstacle by itself or moving up to a predetermined destination.

The first cleaner 100a is a robot cleaner having both the navigation function and the obstacle detection function and can control the follow-up of the mobile device 200. The first cleaner 100a may be a dry cleaner or a wet cleaner.

The first cleaner 100a and the mobile device 200 can communicate with each other through a network (not shown), but may directly communicate with each other.

Here, the communication using the network is may be communication using, for example, WLAN, WPAN, Wi-Fi, Wi-Fi Direct, Digital Living Network Alliance (DLNA), Wireless Broadband (WiBro), World Interoperability for Microwave Access (WiMAX), etc. The mutual direct communication may be performed using, for example, UWB, Zigbee, Z-wave, Blue-Tooth, RFID, and Infrared Data Association (IrDA), and the like.

If the first cleaner 100a and the mobile device 200 are close to each other, the mobile device 200 may be set to follow the first cleaner 100a through a manipulation in the first cleaner 100a.

If the first cleaner 100a and the mobile device 200 are far away from each other, although not shown, the mobile device 200 may be set to follow the first cleaner 100a through a manipulation in an external terminal 300 (see FIG. 5A).

Specifically, follow-up relationship between the first cleaner 100a and the mobile device 200 may be established through network communication with the external terminal 300. Here, the external terminal 300 is an electronic device capable of performing wired or wireless communication, and may be a tablet, a smart phone, a notebook computer, or the like. At least one application related to follow-up control by the first cleaner 100a (hereinafter, "follow-up related application") may be installed in the external terminal 300.

The user may execute the follow-up related application installed in the external terminal 300 to select and register the mobile device 200 subjected to the follow-up control by the first cleaner 100a. When the mobile device 200 subjected to the follow-up control is registered, the external terminal may recognize product information of the mobile device, and such product information may be provided to the first cleaner 100a via the network.

The external terminal 300 may recognize the position of the first cleaner 100a and the position of the registered mobile device 200 through communication with the first cleaner 100a and the registered mobile device 200. Afterwards, the first cleaner 100a may move toward the position of the registered mobile device 200 or the registered mobile device 200 may move toward the position of the first cleaner 100a according to a control signal transmitted from the external terminal 300. When it is detected that the relative positions of the first cleaner 100a and the registered mobile device 200 are within a predetermined following distance, the follow-up control for the mobile device 200 by the first cleaner 100a is started. After then, the follow-up control is performed by direct communication between the first cleaner 100a and the mobile device 200 without the intervention of the external terminal 300.

The setting of the follow-up control may be released by the operation of the external terminal 300 or automatically terminated as the first cleaner 100a and the mobile device 200 move away from the predetermined following distance.

The user can change, add or remove the mobile device 200 to be controlled by the first cleaner 100a by manipulating the first cleaner 100a or the external terminal 300. For example, referring to FIG. 14B, the first cleaner 100a may perform the follow-up control for at least one mobile device 200 of another cleaner 200a or 100b, an air purifier 200b, a humidifier 200c, and a dehumidifier 200d.

In general, since the mobile device 200 is different from the first cleaner 100a in its function, product size, and moving ability, it is difficult for the mobile device 200 to follow the movement path of the mobile terminal 100a as it is. For example, there may be an exceptional situation in which it is difficult for the mobile device 200 to follow the movement path of the first cleaner 100a according to a geographic feature of a space, a size of an obstacle, and the like.

In consideration of such an exceptional situation, the mobile device 200 may move or wait by omitting a part of the movement path even if it recognizes the movement path of the first cleaner 100a. To this end, the first cleaner 100a may detect whether or not the exceptional situation occurs, and control the mobile device 200 to store data corresponding to the movement path of the first cleaner 100a in a memory or the like. Then, depending on situations, the first cleaner 100a may control the mobile device 200 to move with deleting part of the stored data or to wait in a stopped state.

FIG. 14C illustrates an example of a follow-up control between the first cleaner 100a and the mobile device 200, for example, the air cleaner 200b having a moving function. The first cleaner 100a and the air purifier 200b may include communication modules A and B for determining relative positions thereof, respectively. The communication modules A and B may be one of modules for emitting and receiving an IR signal, an ultrasonic signal, a carrier frequency, or an impulse signal. The recognition of the relative positions through the communication modules A and B has been described above in detail, so a description thereof will be omitted.

The air purifier 200b may receive moving information corresponding to a moving command (e.g., changes in moving including a moving direction and a moving speed, moving stop, etc.) from the first cleaner 100a, move according to the received moving information, and perform air purification.

Accordingly, the air purification may be performed in real time with respect to a cleaning space in which the first cleaner 100a operates. In addition, since the first cleaner 100a has already recognized the production information related to the mobile device 200, the first cleaner 100a can control the air purifier 200b to record the moving information of the first cleaner 100a, and move with deleting part of the moving information or wait in a stopped state.

As described above, according to a plurality of robot cleaners according to an embodiment of the present disclosure, the following cleaner may perform cleaning without any interruption while following the leading cleaner. Furthermore, when the following cleaner senses an obstacle or the like to perform turning, the leading cleaner, the following cleaner, or the leading cleaner and the following cleaner may temporarily change their paths to move while avoiding each other, thereby performing follow-up control in a more natural and efficient manner. Moreover, when the moving direction of the leading cleaner is changed, the direction of a signal received from the following cleaner may be detected to resume follow-up after confirming that the following cleaner is behind the leading cleaner, thereby performing follow-up with no signal interference and error occurrence.

The present disclosure described above may be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 1800. The above detailed description should not be limitedly construed in all aspects and should be considered as illustrative. The scope of the present invention should be determined by rational interpretation of the appended claims, and all changes within the scope of equivalents of the present invention are included in the scope of the present disclosure.

What is the claimed is:

1. A mobile robot, comprising:
a traveling unit configured to move a main body;
a communication unit configured to communicate with another mobile robot that emits a signal; and
a controller configured to recognize the location of the another mobile robot based on the signal, and control the moving of the another mobile robot to follow along a moving path of the main body based on the recognized location,
wherein the controller transmits a signal corresponding to a change of the moving direction to the main body in response to the change of the moving direction, and senses a change in the receiving direction of the signal according to the change of moving direction to transmit a control command for restricting the follow-up to the another mobile robot.

2. The mobile robot of claim 1, wherein the control command for restricting the follow-up comprises a moving stop command of the another mobile robot and a follow-up release command for the main body, and the restriction of the follow-up is continued until a specified condition is satisfied subsequent to sensing the change in the receiving direction of the signal.

3. The mobile robot of claim 1, wherein the restriction of the follow-up is released when at least one of a lapse of a predetermined period of time subsequent to sensing a change in the receiving direction of the signal, an increase of a separation distance between the main body and the another mobile robot by more than a predetermined range, and a re-change in the receiving direction of the signal is satisfied.

4. The mobile robot of claim 1, wherein the controller varies the moving speed of the traveling unit or transmits a stop command to the another mobile robot so that the another mobile robot does not deviate from a specified critical follow-up distance while the another mobile robot follows the moving path of the main body.

5. The mobile robot of claim 1, wherein the controller transmits a control command for controlling the another mobile robot to move or rotate while avoiding the main body when the main body approaches the another mobile robot within a reference range according to the change of the moving direction.

6. The mobile robot of claim 1, wherein the controller transmits a control command for restricting the follow-up to the another mobile robot when the signal is received from the front side with respect to the moving direction of the main body, and controls the another mobile robot to follow the moving path of the main body again when the signal is received from the rear side with respect to the moving direction of the main body while the main body is moving in the next moving region subsequent to the change of the moving direction.

7. The mobile robot of claim 1, wherein the controller controls the traveling unit to allow the main body to move out of a current moving region while avoiding the another mobile robot when the main body approaches the another mobile robot within a reference range according to the change of the moving direction, and determined that the another mobile robot is unable to move or rotate while avoiding the main body.

8. The mobile robot of claim 1, wherein the controller transmits a control command for controlling the another mobile robot to perform reverse moving by deviating from a specified critical follow-up distance when the main body approaches the another mobile robot within a reference range according to the change of the moving direction, and determined that both the main body and the another mobile robot are unable to move out of a current moving region.

9. A plurality of mobile robots comprising a first mobile robot and a second mobile robot, wherein the first mobile robot communicates with the second mobile robot emitting a first signal to recognize the location of the second mobile robot, and controls the moving of the second mobile robot to follow the moving path of the first mobile robot based on the recognized location, and the second mobile robot communicates with the first mobile robot emitting a second signal to recognize the location of the first mobile robot, and receives a corresponding signal in response to a change in the moving direction of the first mobile robot, and the first mobile robot senses a change in the receiving direction of the first signal according to the change of the moving direction to control the second mobile robot so as to restrict follow-up to the first mobile robot.

10. The plurality of mobile robots of claim 9, wherein the first mobile robot varies the moving speed of the first mobile robot or transmits a stop command to the second mobile robot so that the second mobile robot does not deviate from a specified critical follow-up distance while the second mobile robot follows the first mobile robot.

11. The plurality of mobile robots of claim 9, wherein when the first mobile robot approaches the second mobile robot within a reference range according to the change of the moving direction, the first mobile robot controls the second mobile robot to move while avoiding the second mobile robot by moving out of a current moving region.

12. The plurality of mobile robots of claim 9, wherein the second mobile robot discontinues follow-up to the first mobile robot when the first signal is received from the front side with respect to the moving direction of the first mobile robot, and the second mobile robot follows the moving path of the first mobile robot again when the first signal is received from the rear side with respect to the moving direction of the second mobile robot while the first mobile robot moves in the next moving region subsequent to the change of the moving direction.

13. A method of controlling a plurality of mobile robots, the method comprising:
allowing a first mobile robot emitting a first signal to communicate with a second mobile robot emitting a second signal;
mutually recognizing the locations of the first and second mobile robots based on the first and second signals;
allowing the second mobile robot to follow along the moving path of the first mobile robot based on the recognized location; and
receiving a signal corresponding to a change in the moving direction of the first mobile robot at the second mobile robot in response to the change of the moving direction, and allowing the first mobile robot to sense a change in the receiving direction of the second signal according to the change of the moving direction to restrict the follow-up.

14. The method of claim 13, wherein said restricting the follow-up comprises the moving stop of the second mobile robot and follow-up release for the first mobile robot, and the restriction of the follow-up is terminated when a specified condition is satisfied subsequent to a change in the receiving direction of the second signal.

15. The method of claim 13, wherein said restriction the follow-up is released when at least one of a lapse of a predetermined period of time subsequent to sensing a change in the receiving direction of the second signal, an increase of a separation distance between the plurality of mobile robots by more than a predetermined range, and a re-change in the receiving direction of the second signal is satisfied.

16. The method of claim 13, wherein said following along the moving path of the first mobile robot comprises varying the moving speed of the traveling unit of the first mobile robot or stopping the second mobile robot so that the second mobile robot does not deviate from a specified critical follow-up distance while following the moving path of the first mobile robot.

17. The method of claim 13, further comprising:
controlling the second mobile robot to move while avoiding the first mobile robot by moving out of a current moving region when the first mobile robot approaches the second mobile robot within a reference range according to the change of the moving direction.

18. The method of claim 13, wherein said sensing a change in the receiving direction of the second signal to restrict the follow-up is carried out while the second signal is received from the front with respect to the moving direction of the first mobile robot subsequent to the change of the moving direction, and further comprises allowing the second mobile robot to follow the moving path of the first mobile robot again when the second signal is received from the rear side with respect to the moving direction of the first mobile robot.

* * * * *